(12) United States Patent
Yoshihara et al.

(10) Patent No.: US 10,220,872 B2
(45) Date of Patent: Mar. 5, 2019

(54) STEERING SYSTEM

(71) Applicant: JTEKT CORPORATION, Osaka-shi, Osaka (JP)

(72) Inventors: Yoshihito Yoshihara, Kashihara (JP); Yu Myohoji, Habikino (JP); Atsumune Nagatani, Kashihara (JP); Masayuki Nagaoka, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 77 days.

(21) Appl. No.: 15/636,106

(22) Filed: Jun. 28, 2017

(65) Prior Publication Data
US 2018/0009463 A1 Jan. 11, 2018

(30) Foreign Application Priority Data

Jul. 5, 2016 (JP) .................................. 2016-133535
Nov. 18, 2016 (JP) .................................. 2016-225355

(51) Int. Cl.
| | | |
|---|---|---|
| *B62D 1/19* | (2006.01) | |
| *B62D 1/184* | (2006.01) | |
| *B62D 1/185* | (2006.01) | |

(52) U.S. Cl.
CPC ............. *B62D 1/195* (2013.01); *B62D 1/184* (2013.01); *B62D 1/185* (2013.01)

(58) Field of Classification Search
CPC ........ B62D 1/184; B62D 1/185; B62D 1/195; B62D 1/19
See application file for complete search history.

(56) References Cited

U.S. PATENT DOCUMENTS

| | | | | |
|---|---|---|---|---|
| 5,009,120 A | * | 4/1991 | Iseler ..................... | B62D 1/184 280/775 |
| 9,623,897 B2 | * | 4/2017 | Myohoji ................ | B62D 1/195 |
| 9,623,898 B2 | * | 4/2017 | Sakuda .................. | B62D 1/185 |
| 9,783,222 B2 | * | 10/2017 | Tomiyama ............. | B62D 1/184 |

(Continued)

FOREIGN PATENT DOCUMENTS

| | | |
|---|---|---|
| EP | 2 910 452 A2 | 8/2015 |
| JP | 2010-254204 A | 11/2010 |

(Continued)

OTHER PUBLICATIONS

Jan. 8, 2018 European Search Report issued in European Patent Application No. EP 17 17 9040.5.

*Primary Examiner* — Ruth Ilan
(74) *Attorney, Agent, or Firm* — Oliff PLC

(57) ABSTRACT

A steering system includes a fastening mechanism that makes an upper jacket fastened to be held by a lower jacket. In a fastened state of the fastening mechanism, a first tooth member on the upper jacket side is meshed with a second tooth member on the lower jacket side. The second tooth member is connected to the lower jacket via a guide shaft (connecting member) that is fracturable during a secondary collision. During the secondary collision in an unfastened state of the fastening mechanism, a second engagement portion (driving member) that moves in a column axial direction integrally with the upper jacket abuts on the second tooth member in an unmeshed state to fracture the guide shaft, and deforms an impact absorbing member via the second tooth member to absorb an impact.

8 Claims, 19 Drawing Sheets

(56) References Cited

U.S. PATENT DOCUMENTS

| | | | |
|---|---|---|---|
| 9,944,311 B2 * | 4/2018 | Kubota | B62D 1/184 |
| 2010/0282016 A1 * | 11/2010 | Oehri | B62D 1/184 |
| | | | 74/493 |
| 2010/0300238 A1 * | 12/2010 | Ridgway | B62D 1/184 |
| | | | 74/493 |
| 2011/0185839 A1 * | 8/2011 | Inoue | B62D 1/184 |
| | | | 74/493 |
| 2012/0125139 A1 * | 5/2012 | Tinnin | B62D 1/184 |
| | | | 74/493 |
| 2013/0118292 A1 * | 5/2013 | Sulser | B62D 1/184 |
| | | | 74/493 |
| 2017/0232994 A1 * | 8/2017 | Sakuda | B62D 1/184 |
| | | | 74/493 |
| 2017/0240199 A1 * | 8/2017 | Nagatani | B62D 1/184 |
| 2017/0274922 A1 * | 9/2017 | Uesaka | B62D 1/184 |
| 2017/0320513 A1 * | 11/2017 | Dubay | B62D 1/184 |
| 2017/0355392 A1 * | 12/2017 | Nagatani | B62D 1/184 |
| 2018/0105196 A1 * | 4/2018 | Bodtker | B62D 1/195 |
| 2018/0178826 A1 * | 6/2018 | Kagawa | B62D 1/195 |

FOREIGN PATENT DOCUMENTS

| | | | |
|---|---|---|---|
| JP | 2011-516323 A | | 5/2011 |
| JP | 2016193712 A | * | 11/2016 |
| WO | 2009/121386 A1 | | 10/2009 |

* cited by examiner

STEERING SYSTEM

INCORPORATION BY REFERENCE

The disclosure of Japanese Patent Applications No. 2016-133535 filed on Jul. 5, 2016 and No. 2016-225355 filed on Nov. 18, 2016 including the specification, drawings and abstract, is incorporated herein by reference in its entirety.

BACKGROUND OF THE INVENTION

1. Field of the Invention

The present invention relates to a steering system.

2. Description of Related Art

In an automotive steering column in Japanese Translation of PCT international Application Publication No. 2011-516323 (JP-T-2011-516323), an adjusting unit on an upper side is disposed between a pair of side plates of a supporting unit on a lower side. A fastening mechanism for fastening the pair of side plates of the supporting unit is provided with a fastener bolt inserted in the side plates. A locking member is disposed on the fastener bolt. A mating locking member to mesh with the locking member is formed in an integrated manner with a fracture plate fixed to the adjusting unit. When the fastening mechanism is in a fastened state, the locking member is engaged with the mating locking member, and the position of the adjusting unit relative to the supporting unit is locked.

During a secondary collision when the fastening mechanism is in a fastened state (in an engaged state of the locking member and the mating locking member), the adjusting unit on the upper side slides relative to the supporting unit. This causes the mating locking member to fracture the fracture plate, and thus absorbs an impact due to the secondary collision.

The secondary collision can occur not only in the fastened state of the fastening mechanism, but also in an unfastened state (in a state where the locking member is disengaged from the mating locking member). However, according to JP-T-2011-516323, the impact due to the secondary collision cannot be absorbed in the unlocked state. Thus, an impact absorbing member provided separately from the fracture plate can be considered to be used to absorb the impact due to the secondary collision in the unfastened state. That case, however, leads to a complicated structure.

SUMMARY OF THE INVENTION

It is an object of the present invention to provide a steering system capable of absorbing the impact due to the secondary collision even in the unfastened state with a simple structure, regardless of the fastening state.

According to an aspect of the present invention, a steering system is characterized by including a steering shaft that is telescopic in a column axial direction; a column jacket that includes a lower jacket and an upper jacket fitted with the lower jacket, that rotatably supports the steering shaft, and that is telescopic in the column axial direction during a telescopic adjustment; a fastening mechanism that makes the upper jacket fastened to be held by the lower jacket; an impact absorbing member that is supported by the lower jacket and absorbs an impact by being deformed; a first tooth member that moves in the column axial direction integrally with the upper jacket; a second tooth member that is placed in a meshed state with the first tooth member at time of fastening by the fastening mechanism, and that is placed in an unmeshed state of releasing the meshing at time of unfastening by the fastening mechanism; a connecting member that connects the second tooth member to the lower jacket, and that is fracturable during a secondary collision; and a driving member that is movable in the column axial direction integrally with the upper jacket, and that abuts on the second tooth member in the unmeshed state to fracture the connecting member and deforms the impact absorbing member via the second tooth member during the secondary collision in the unfastened state of the fastening mechanism, and is characterized in that the second tooth member in the meshed state is configured to fracture the connecting member and deform the impact absorbing member during the secondary collision in the fastened state of the fastening mechanism.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
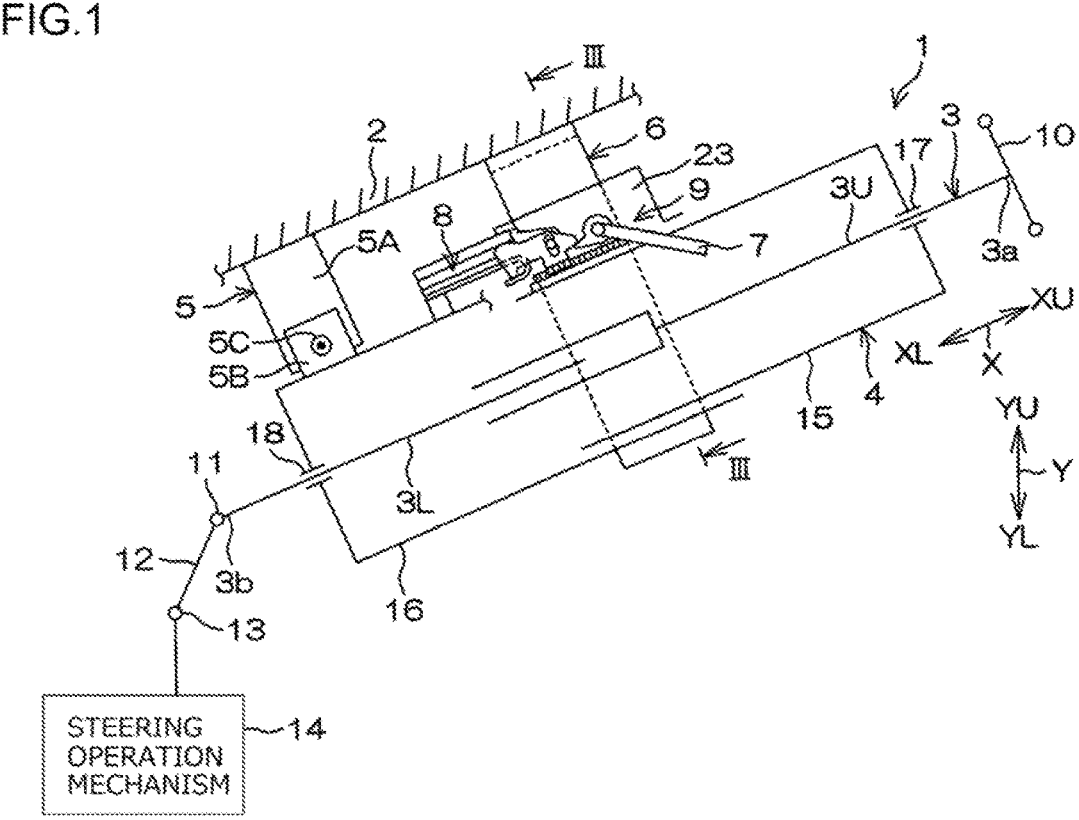
FIG. 1 is a schematic side view of a steering system according to a first embodiment of the present invention.
Figure 2:
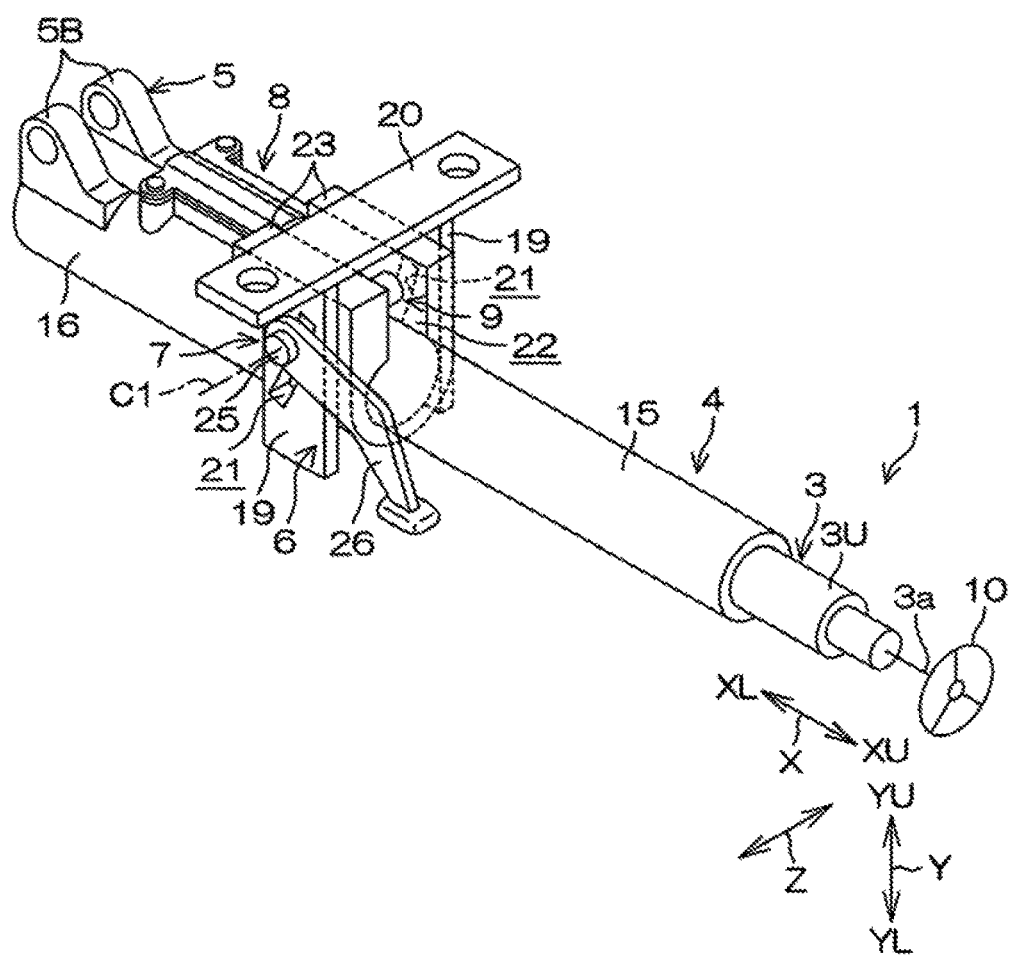
FIG. 2 is a schematic perspective view of the steering system according to the first embodiment.

The following describes embodiments embodying the present invention according to the drawings. FIG. 1 is a schematic side view of a steering system 1 according to a first embodiment of the present invention. The left side of FIG. 1 corresponds to the front side of a vehicle body 2 where the steering system 1 is mounted, and the right side of FIG. 1 corresponds to the rear side of the vehicle body 2. The upper side of FIG. 1 corresponds to the upper side of the vehicle body 2, and the lower side of FIG. 1 corresponds to the lower side of the vehicle body 2. FIG. 2 is a perspective view of the steering system 1.

With reference to FIG. 1, the steering system 1 mainly includes a steering shaft 3, a column jacket 4, a lower bracket 5, an upper bracket 6, a fastening mechanism 7, an impact absorbing mechanism 8, and a tooth lock mechanism 9. The extending direction of the steering shaft 3 corresponds to a column axial direction X. A steering member 10, such as a steering wheel, is connected to one end 3a (upper end in the column axial direction X) of the steering shaft 3. Another end 3b (lower end in the column axial direction X) of the steering shaft 3 is connected to a steering operation mechanism 14 sequentially via a universal joint 11, an intermediate shaft 12, and a universal joint 13. The steering operation mechanism 14 is, for example, a rack-and-pinion mechanism that steers a steered wheel or wheels (not shown) in response to transmission of a steering rotation of the steering member 10.

The steering shaft 3 includes a tubular upper shaft 3U and a lower shaft 3L. The upper shaft 3U is fitted with the lower shaft 3L by, for example, spline fitting or serration fitting so as to be relatively slidable. The steering member 10 is connected to one end (upper end in the column axial direction X) of the upper shaft 3U. The steering shaft 3 is telescopic in the column axial direction X through movement of the upper shaft 3U relative to the lower shaft 3L in the column axial direction X. The upper side and the lower side in the column axial direction X are referred to as a column axial directional upper side XU and a column axial directional lower side XL, respectively.

The column jacket 4 is a hollow body extending in the column axial direction X. The column jacket 4 includes an upper jacket 15 and a lower jacket 16. The upper jacket 15 is slidably fitted in the lower jacket 16 in the column axial direction X. The column jacket 4 is telescopic in the column axial direction X. The steering shaft 3 is inserted in the column jacket 4, and is rotatably supported by the column jacket 4 via a plurality of bearings 17 and 18. Specifically, the upper jacket 15 rotatably supports the upper shaft 312 via the bearing 17, and the lower jacket 16 rotatably supports the lower shaft 3L via the bearing 18.

The upper jacket 15 is connected to the upper shaft 3U via the bearing 17. The lower jacket 16 is connected to the lower shaft 3L via the bearing 18. This configuration allows the upper jacket 15 to move in the column axial direction X relative to the lower jacket 16. This allows the column jacket 4 to extend and contract together with the steering shaft 3 in the column axial direction X.

This extension-contraction motion of the steering shaft 3 and the column jacket 4 is called "telescoping". A position adjustment in the column axial direction X of the steering member 10 by the telescoping is called a telescopic adjustment. The lower bracket 5 includes a fixed bracket 5A fixed to the vehicle body 2 and a movable bracket 5B fixed to a lower part in the column axial direction X of the lower jacket 16. The movable bracket 5B is rotatably supported via a central axis 5C extending in a direction orthogonal to the column axial direction X (in the right-left direction of the vehicle body 2, i.e., in a direction orthogonal to the plane of FIG. 1).

The column jacket 4 and the steering shaft 3 are rotatable upward and downward about the central axis 5C. The rotation here is called "tilting", and a moving direction that is substantially in the up-down direction about the central axis 5C is called a tilt direction Y. An up-down adjustment of the steering member 10 by the tilting is called a tilt adjustment. The upper side in the tilt direction Y is referred to as a tilt directional upper side YU, and the lower side in the tilt direction Y is referred to as a tilt directional lower side YL.

As shown in FIG. 2, a direction orthogonal to both the column axial direction X and the tilt direction Y corresponds to a right-left direction Z of the vehicle body 2. The upper bracket 6 includes a pair of side plates 19 and a connecting plate 20. The pair of side plates 19 face each other in the right-left direction Z across the column jacket 4. The connecting plate 20 connects the upper ends of the pair of side plates 19 to each other. The upper bracket 6 forms as a whole a groove shape opening downward as viewed from the column axial direction X. The connecting plate 20 has portions extending laterally toward both sides from the pair of side plates 19, and is fixed to the vehicle body 2 (refer to FIG. 1) with bolts (not shown) inserted in the portions. Thus, the upper bracket 6 is fixed to the vehicle body 2.

As shown in FIG. 2, circular arc-like tilt grooves 21 centered on the central axis 5C of the tilt are formed in the pair of side plates 19. The lower jacket 16 includes a slit 22 extending in the column axial direction X and a pair of fastened portions 23 arranged on both sides of the slit 22. The slit 22 is formed at a portion on the column axial directional upper side XU of the lower jacket 16. The pair of fastened portions 23 are plate-like portions facing each other in the right-left direction Z across the slit 22 at the portion on the column axial directional upper side XU of the lower jacket 16. The pair of fastened portions 23 are clamped and fastened to elastically reduce the diameter of the lower jacket 16, which in turn fastens the upper jacket 15.

Figure 3:
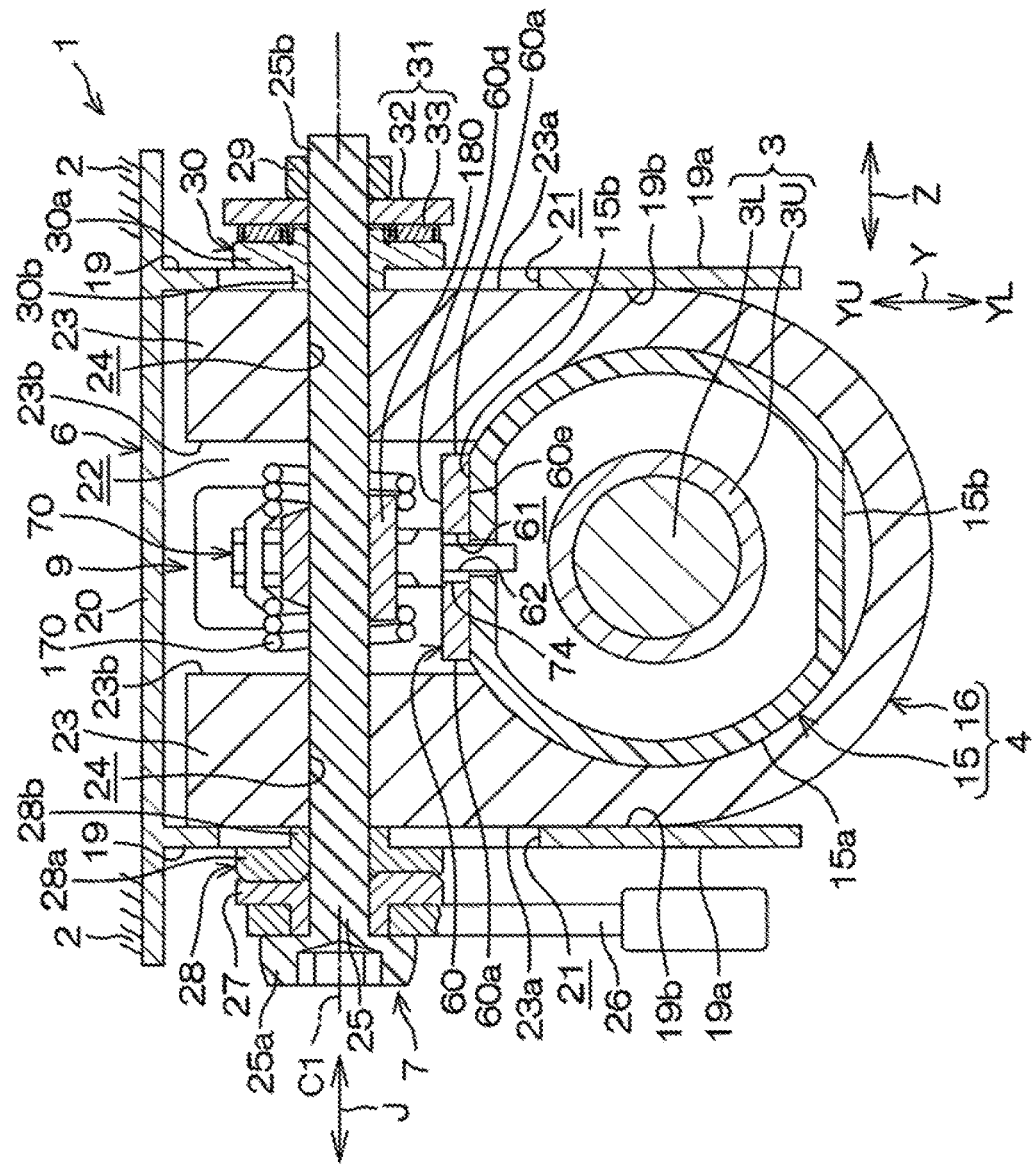
FIG. 3 is a sectional view of FIG. 1.

FIG. 3 is a III-III sectional view of FIG. 1. As shown in FIG. 3, each of the side plates 19 of the upper bracket 6 includes an outer side surface 19a and an inner side surface 19b. Each of the fastened portions 23 has a shaft insertion hole 24 formed therein that is formed by a circular hole passing through the fastened portion 23 in the right-left direction Z. Each of the plate-like fastened portions 23 includes an outer side surface 23a and an inner side surface 23b. The outer side surface 23a on each of the plate-like fastened portions 23 faces the inner side surface 19b on corresponding one of the side plates 19 of the upper bracket 6.

Parts in the circumferential direction of an outer circumferential surface 15a on the upper jacket 15 are provided with a pair of flat portions 15b extending parallel to each other in a predetermined range in the column axial direction X (direction orthogonal to the plane of FIG. 3). A plate-like first tooth member 60 of the tooth lock mechanism 9 is fixed to one of the flat portions 15b. End surfaces 60a on both sides (in the right-left direction Z) of the first tooth member 60 closely face the respective inner side surfaces 23b on the pair of fastened portions 23.

During the telescopic adjustment, the inner side surfaces 23b on the pair of fastened portions 23 guide the movement in the column axial direction X of the upper jacket 15 via the pair of end surfaces 60a on the first tooth member 60, and restricts rotation of the upper jacket 15 relative to the lower jacket 16. The following describes the fastening mechanism 7. The fastening mechanism 7 is a mechanism to lock and unlock the position of the steering member 10 (refer to FIG. 1) after the tilt adjustment and/or the telescopic adjustment are/is finished.

The fastening mechanism 7 includes a fastening shaft 25, an operating lever 26, a ring-like cam 27, one fastening member 28 serving as a ring-like cam follower, a nut 29, another fastening member 30, and an intervening member 31. The cam 27, the one fastening member 28, the nut 29, the other fastening member 30, and the intervening member 31 are supported by the outer circumference of the fastening shaft 25. The fastening shaft 25 is constituted by a bolt inserted in the tilt grooves 21 of both the side plates 19 of the upper bracket 6 and the shaft insertion holes 24 of both the fastened portions 23 of the lower jacket 16. The fastening shaft 25 is supported by both the side plates 19. A large-diameter head 25a provided at one end of the fastening shaft 25 is fixed to the operating lever 26 so as to be integrally rotatable therewith.

The cam 27 and the cam follower (the one fastening member 28) are interposed between the head 25a of the fastening shaft 25 and one of the side plates 19, and constitute a force conversion mechanism that converts operating torque applied to the operating lever 26 into an axial force of the fastening shaft 25 (fastening force to fasten the pair of side plates 19). The cam 27 is connected to the operating lever 26 so as to be integrally rotatable therewith, and is restricted from moving relative to the fastening shaft 25 in a fastening shaft direction J that is a central axial direction of the fastening shaft 25. The cam follower (the one fastening member 28) makes a cam engagement with the earn 27, and fastens one of the side plates 19.

The one fastening member 28 (cam follower) and the other fastening member 30 include fastening plate portions 28a and 30a, respectively, that fasten the corresponding side plates 19, and include boss portions 28b and 30b, respectively, fitted in the corresponding tilt grooves 21. The fitting of the boss portions 28b and 30b to the corresponding grooves 21 restricts the fastening members 28 and 30 from rotating. Both the fastening members 28 and 30 are supported by the fastening shaft 25 so as to be movable in the fastening shaft direction J.

The nut 29 is screwed on a threaded portion 25b at the other end of the fastening shaft 25. The intervening member 31 is interposed between the other fastening member 30 and the nut 29. The intervening member 31 includes a washer 32 and a needle roller bearing 33. The cam 27 rotates relative to the one fastening member 28 (cam follower) along with the rotation of the operating lever 26 toward the locking side. This operation moves the one fastening member 28 in the fastening shaft direction J, and clamps and fastens the pair of side plates 19 of the upper bracket 6 between both (fastening plate portions 28a and 30a of) the fastening members 28 and 30.

This causes each of the side plates 19 of the upper bracket 6 to fasten corresponding one of the fastened portions 23 of the lower jacket 16. As a result, a frictional engaging force between each of the side plates 19 and corresponding one of the fastened portions 23 restricts the lower jacket 16 from moving in the tilt direction Y, and achieves a tilt lock. The fastening of both the fastened portions 23 causes the portion on the column axial directional upper side XU of the lower jacket 16 to fasten the upper jacket 15. Due to this, a frictional engaging force between both the jackets 15 and 16 restricts the upper jacket 15 from moving in the column axial direction X, and thus, a telescopic lock is achieved.

Figure 4:
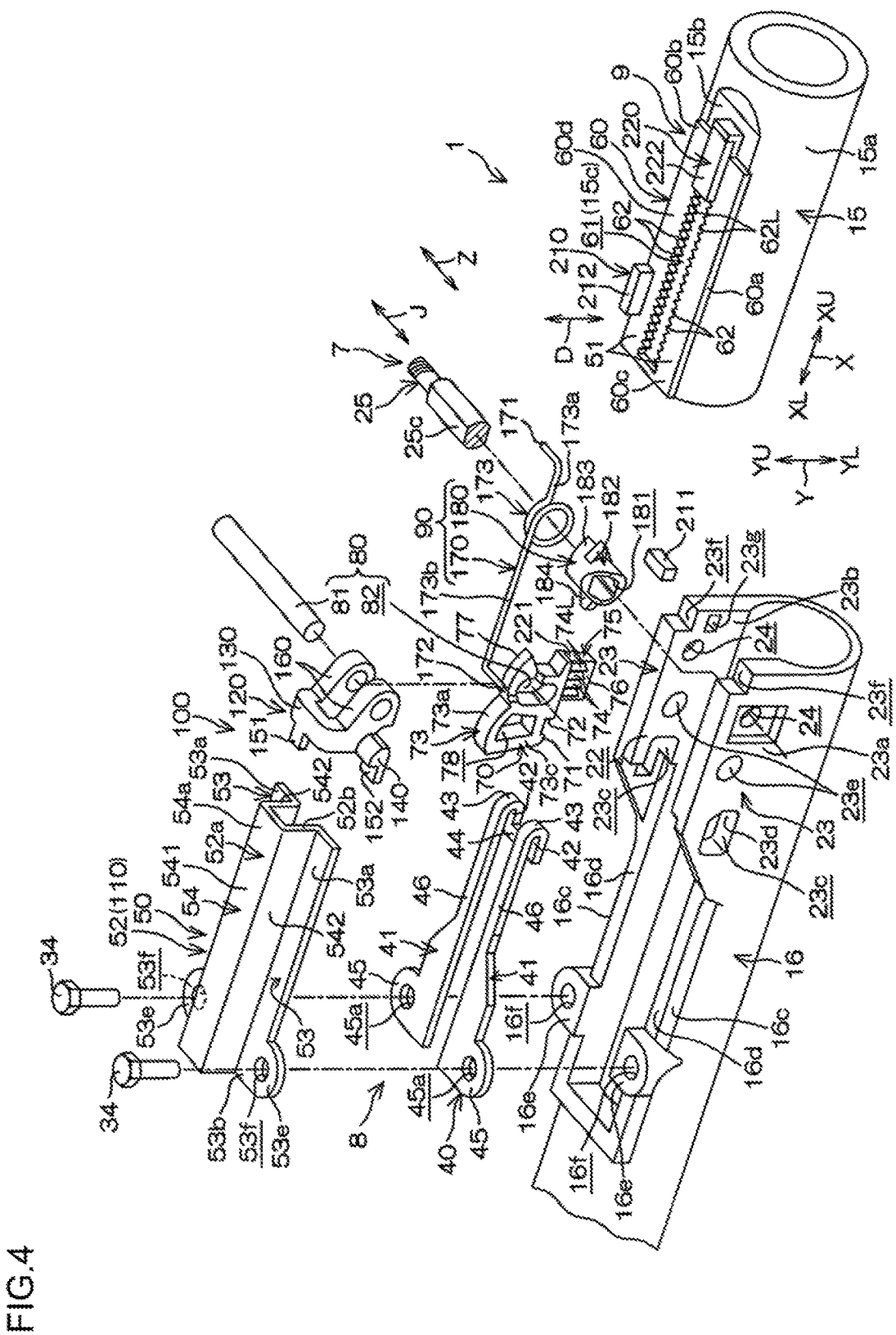
FIG. 4 is an exploded perspective view of the steering system according to the first embodiment, mainly showing structures of an impact absorbing mechanism and a tooth lock mechanism.

FIG. 4 is a schematic exploded perspective view of the impact absorbing mechanism 8 and the tooth lock mechanism 9. As shown in FIG. 4, the impact absorbing mechanism 8 includes an impact absorbing member 40 and a guidance/restriction mechanism 50. The impact absorbing member 40 is moved and deformed during a secondary collision to absorb an impact due to the secondary collision. The guidance/restriction mechanism 50 guides and restricts the movement and deformation of the impact absorbing member 40. The impact absorbing member 40 includes a pair of first plate portions 41, a pair of second plate portions 42, a pair of fold-back portions 43, and a movable portion 44. Each of the first plate portions 41 includes a fixed portion 45 and a planned deformation portion 46.

The pair of first plate portions 41 of the impact absorbing member 40 is connected to the corresponding second plate portions 42 through the corresponding fold-back portions 43. The movable portion 44 serves as a connecting portion connecting the lower ends in the column axial direction X of the second plate portions 42 to each other. The movable portion 44 as the connecting portion moves integrally with the upper jacket 15 toward the column axial directional lower side XL during the secondary collision. The tooth lock mechanism 9 includes the first tooth member 60, a second tooth member 70, a guide mechanism 80, and an interlocking mechanism 90. The first tooth member 60 is fixed to the upper jacket 15. The second tooth member 70 engages with the first tooth member 60. The guide mechanism 80 guides the second tooth member 70. The interlocking mechanism 90 couples motion of the second tooth member 70 with the rotation of the fastening shaft 25.

The guidance/restriction mechanism 50 of the impact absorbing mechanism 8 includes a pair of guidance/restriction surfaces 51 and a guidance/restriction member 52. The pair of guidance/restriction surfaces 51 are provided on the first tooth member 60, and closely face the pair of second plate portions 42 in the tilt direction Y. The pair of guidance/restriction surfaces 51 on the first tooth member 60 extend in parallel with the column axial direction X. During the secondary collision, the pair of guidance/restriction surfaces 51 receive the second plate portions 42 moving integrally with the movable portion 44, and guide the second plate portions 42 to move in parallel with the first plate portions 41 toward the column axial directional lowerside XL. In other words, the pair of guidance/restriction surfaces 51 guide the movement of the movable portion 44 toward the column axial directional lower side XL while keeping the second plate portions 42 increasing in length in the column axial direction X during the secondary collision to be in parallel with the first plate portions 41.

Figure 5:
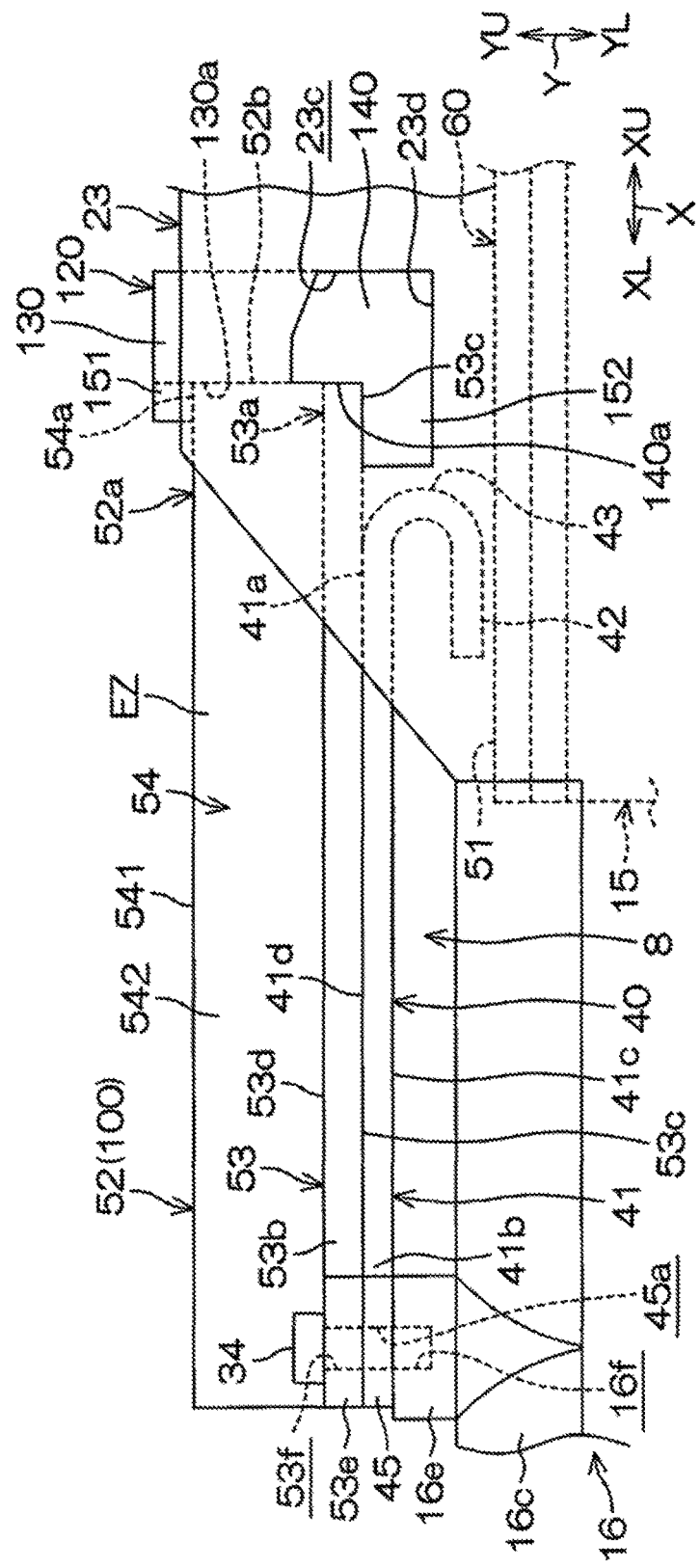
FIG. 5 is a side view of a main part of the steering system according to the first embodiment, mainly showing a structure to support the impact absorbing mechanism.

The guidance/restriction member 52 includes a pair of guidance/restriction plates 53 and a connecting portion 54. The connecting portion 54 includes an upper plate 541 and a pair of side plates 542, and forms a groove shape opening downward. The pair of guidance/restriction plates 53 extend from a pair of open ends of the groove-shaped connecting portion 54 laterally toward both sides (in the right-left direction Z). FIG. 5 is a side view of a main part of the steering system 1, mainly showing a structure to support the impact absorbing mechanism 8. As shown in FIGS. 4 and 5, each of the guidance/restriction plates 53 of the guidance/restriction member 52 is disposed in parallel with corresponding one of the guidance/restriction surfaces 51. Each of the guidance/restriction plates 53 is disposed so as to cover, from outside, corresponding one of the first plate portions 41 of the impact absorbing member 40.

Each of the guidance/restriction plates 53 has an upper end 53a and a lower end 53b in the column axial direction X. As shown in FIG. 5, each of the guidance/restriction plates 53 has an inner surface 53c serving as a surface on the lower jacket 16 side (on the impact absorbing member 40 side) and an outer surface 53d. As shown in FIG. 4, a fixed portion 53e laterally overhanging outward is formed at the lower end 53b of each of the guidance/restriction plates 53. A screw insertion hole 53f is formed in each of the fixed portions 53e.

The pair of first plate portions 41 of the impact absorbing member 40 are connected to the corresponding second plate portions 42 through the corresponding fold-back portions 43. The movable portion 44 (connecting portion) extends in the right-left direction Z so as to connect the lower ends in the column axial direction. X of the second plate portions 42 to each other. The movable portion 44 moves integrally with the upper jacket 15 toward the column axial directional lower side XL during the secondary collision. The pair of first plate portions 41 extend in parallel with each other in the column axial direction X. The pair of first plate portions 41 are separated in the right-left direction Z. The pair of second plate portions 42 extend in parallel with each other in the column axial direction X. The pair of second plate portions 42 are separated in the right-left direction Z. Each of the first plate portions 41 is separated from corresponding one of the second plate portions 42 in the tilt direction Y.

Figure 6:
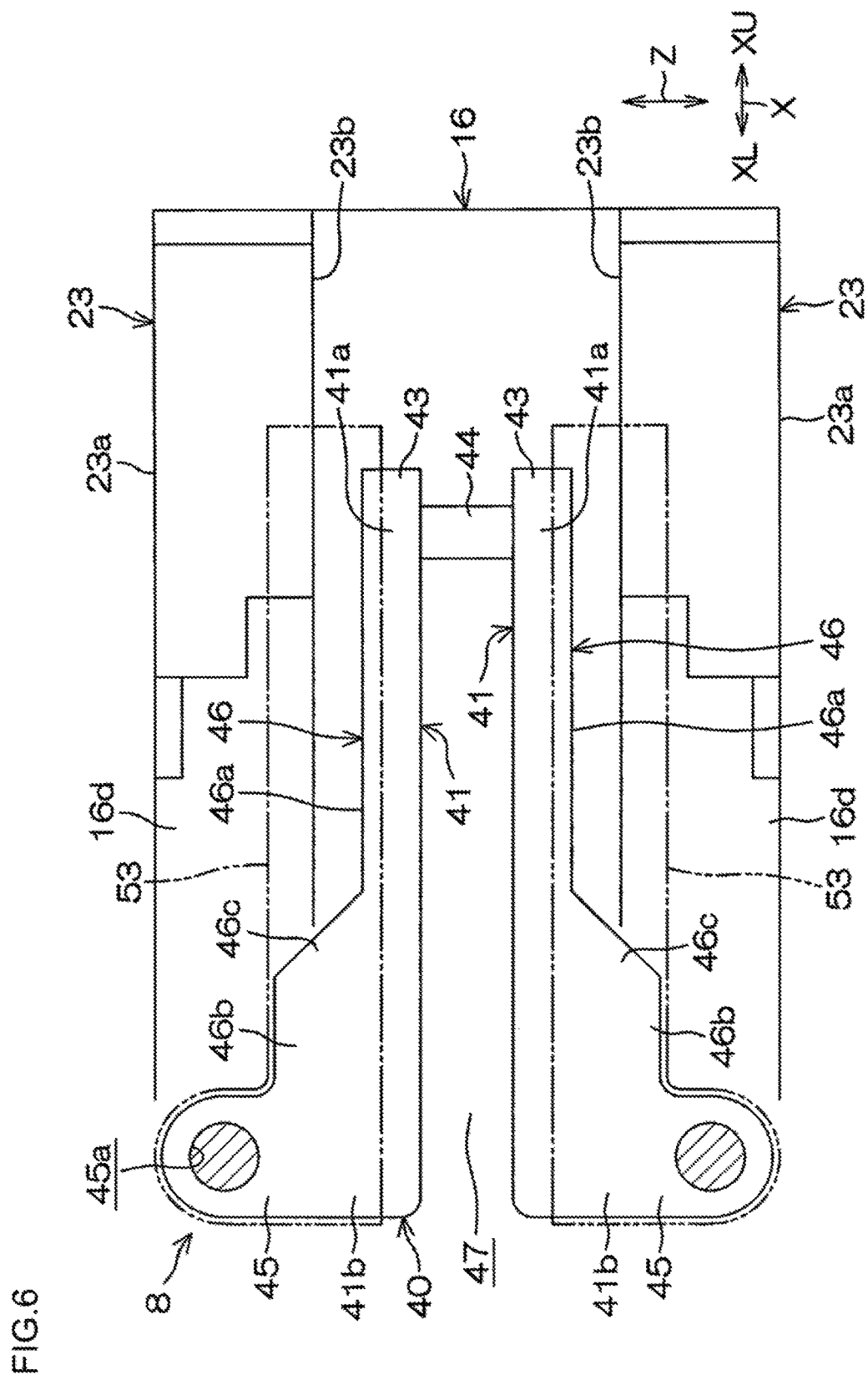
FIG. 6 is a schematic plan view of an impact absorbing member and a lower jacket in the first embodiment.

FIG. 6 is a schematic plan view of the impact absorbing member 40 and the lower jacket 16. As shown in FIGS. 5 and 6, each of the first plate portions 41 has an upper end 41a and a lower end 41b in the column axial direction X. As shown in FIG. 5, each of the first plate portions 41 has an inner surface 41c serving as a surface on the lower jacket 16 side (on the impact absorbing member 40 side) and an outer surface 41d. As shown in FIG. 6, the lower end 41b of each of the first plate portions 41 is provided with the fixed portion 45 constituted by an overhanging portion. A screw insertion hole 45a is formed in each of the fixed portions 45.

As shown in FIG. 4, the lower jacket 16 includes a pair of walls 16c on both sides of the slit 22 on the column axial directional lower side XL of the pair of fastened portions 23. The pair of walls 16e extend in parallel with each other in the column axial direction X, and project toward the tilt directional upper side YU. With respect to the tilt direction Y, the height of the pair of walls 16c is set smaller than the height of the pair of fastened portions 23. The lower jacket 16 includes a pair of fixing portions 16e constituted by bosses projecting from upper surfaces 16d (surfaces on the tilt directional upper side YU) of the pair of walls 16c. A screw hole 16f is formed in each of the fixing portions 16e.

As shown in FIG. 5, each of a pair of fixing members 34 constituted by fixing screws is inserted into the screw insertion hole 53f in the fixed portion 53e of corresponding one of the guidance/restriction plates 53 of the guidance/restriction member 52 and into the screw insertion hole 45a in the fixed portion 45 of corresponding one of the first plate portions 41 of the impact absorbing member 40, and is screwed into the screw hole 16f in corresponding one of the fixing portions 16e of the lower jacket 16. In other words, the fixed portion 53e at the lower end 53b in the column axial direction X of each of the guidance/restriction plates 53 and the fixed portion 45 at the lower end 41b in the column axial direction X of corresponding one of the first plate portions 41 of the impact absorbing member 40 are fastened together to be fixed to the lower jacket 16.

As shown in FIG. 6, each of the first plate portions 41 includes the planned deformation portion 46 extending from the upper end 41a toward the column axial directional lower side XL. The planned deformation portion 46 includes a small-width portion 46a, a large-width portion 46b, and a width-changing portion 46c with respect to the width in the right-left direction Z. The small-width portion 46a is adjacent to the upper end 41a, and has a constant width. The large-width portion 46b is adjacent to the lower end 41b, and has a constant width larger than that of the small-width portion 46a. The width-changing portion 46c lies between the small-width portion 46a and the large-width portion 46b, and has a width gradually increasing toward the large-width portion 46b.

A slit 47 extending in the column axial direction X is formed between the pair of first plate portions 41 with respect to the right-left direction Z. Each of the guidance/restriction plates 53 is disposed so as to cover corresponding one of the first plate portions 41, and restricts the first plate portion 41 from moving toward the tilt directional upper side YU during the secondary collision. In the present embodiment, the width-changing portion 46c is deformed in a folded manner, and increases an impact absorbing load near the end of an impact absorbing stroke of the upper jacket 15 during the secondary collision. Although, in the present embodiment, the small-width portion 46a and the width-changing portion 46c are deformed in a folded manner, the large-width portion 46b may also be deformed in a folded manner. That is, impact absorbing characteristics of the impact absorbing member 40 during the secondary collision can be modified on the basis of the lengths in the column axial direction X of the small-width portion 46a, the large-width portion 46b, and the width-changing portion 46e.

Figure 7:
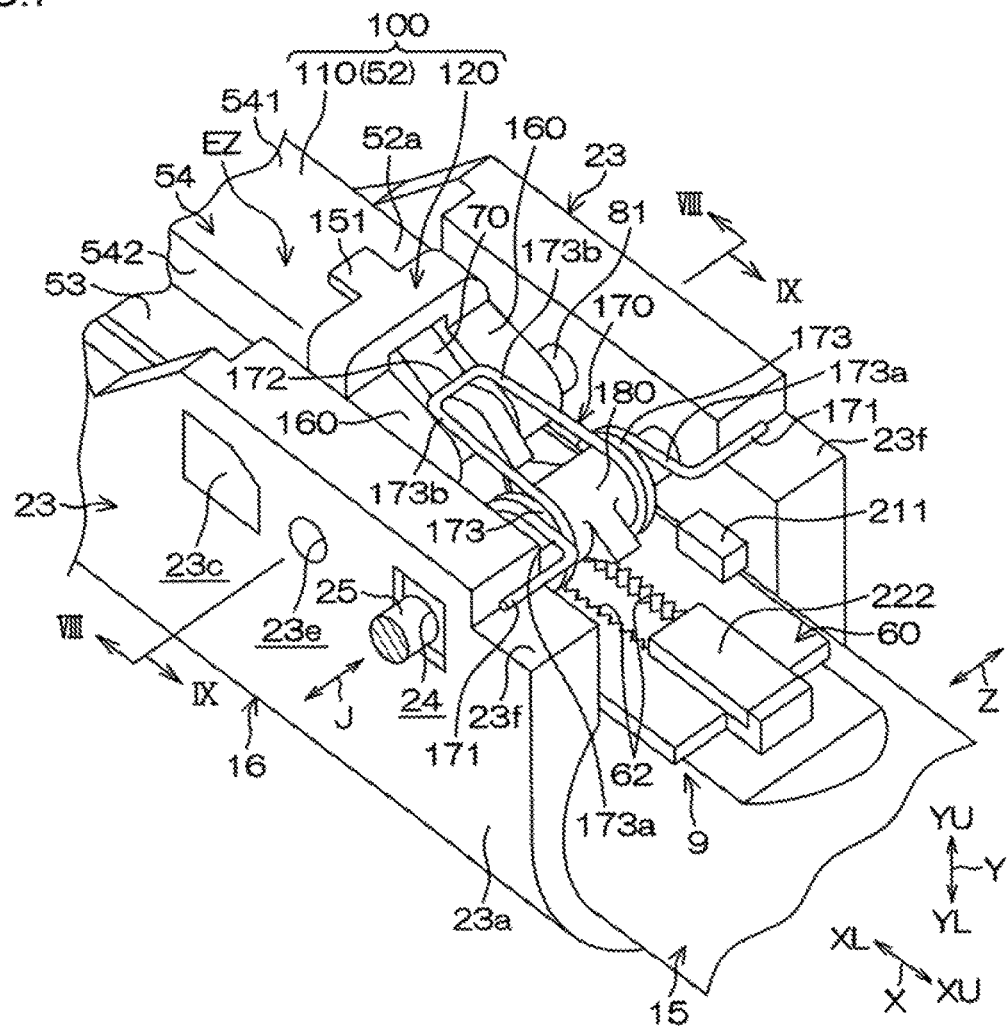
FIG. 7 is a perspective view of a structure in the vicinity of the tooth lock mechanism in the first embodiment.
Figure 13A:
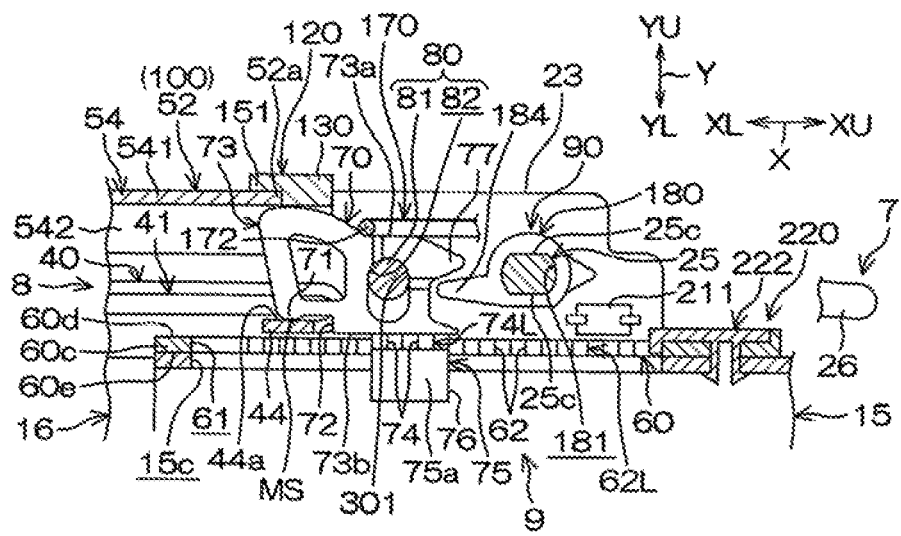
FIGS. 13A and 13B are partially cutaway side views of the structure in the vicinity of the tooth lock mechanism in the first embodiment, FIG. 13A showing the meshed state (locked state), and FIG. 13B showing the unmeshed state (unlocked state)
Figure 13B:
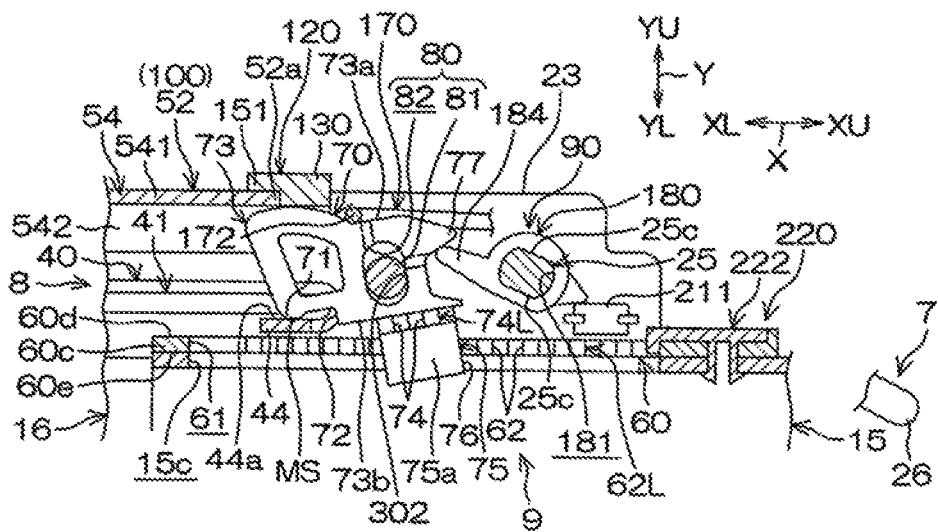

The tooth lock mechanism 9 is a mechanism that meshes teeth with one another at the time of fastening by the fastening mechanism 7 in order to stabilize initial restraint in a telescopic direction during the secondary collision (in other words, in order to hold the telescopic position of the upper jacket 15 at the initial stage of the secondary collision). FIG. 7 is a perspective view of a structure in the vicinity of the tooth lock mechanism 9. FIGS. 13A and 13B are partially cutaway side views of the structure in the vicinity of the tooth lock mechanism 9. FIG. 13A shows a meshed state (locked state) of the tooth lock mechanism 9. FIG. 13B shows an unmeshed state (unlocked state) thereof.

As shown in FIGS. 4, 7, and 13A, the tooth lock mechanism includes the first tooth member 60, the second tooth member 70, the guide mechanism 80, and the interlocking mechanism 90. The following describes the first tooth member 60. As shown in FIG. 4, the first tooth member 60 is fixed by, for example, welding to one of the flat portions 15b of the outer circumferential surface 15a on the upper jacket 15. The first tooth member 60 is formed from a rectangular plate material longitudinally extending in the column axial direction X.

The first tooth member 60 includes the pair of end surfaces 60a in the right-left direction Z (fastening shaft direction J) (refer to FIG. 3), upper and lower ends 60b and 60c in the column axial direction X (refer to FIG. 4), a topside surface 60d, and an underside surface 60e (refer to FIG. 3). The underside surface 60e is a surface on the opposite side of the topside surface 60d, and extends along the flat portions 15b of the upper jacket 15. As shown in FIG. 13A, the first tooth member 60 includes a through-groove 61 and a pair of first tooth rows 62L. The through-groove 61 passes through from the topside surface 60d to the underside surface 60e, and extends in the column axial direction. X. The pair of first tooth rows 62L are provided in the through-groove 61. The upper jacket 15 communicates with the through-groove 61, and has a slit 15c extending in the column axial direction X.

As shown in FIGS. 4 and 13A, the through-groove 61 has a pair of inner wall surfaces extending in the column axial direction X and facing each other in the fastening shaft direction J. The pair of inner wall surfaces have formed thereon the pair of first tooth rows 62L each including a plurality of first teeth 62 arranged in the column axial direction X. As shown in FIG. 4, tooth tips of the first teeth 62 of the pair of first tooth rows 62L face each other in the fastening shaft direction J. A tooth trace direction D (corresponding to a tooth width direction) of the first teeth 62 extends in the depth direction of the through-groove 61 so as to be orthogonal to both the column axial direction X and the fastening shaft direction J.

The pair of guidance/restriction surfaces 51 of the guidance/restriction mechanism 50 of the impact absorbing mechanism 8 are disposed on both sides of the topside surface 60d on the first tooth member 60 with the through-groove 61 interposed therebetween in the right-left direction Z (fastening shaft direction J). The first tooth member 60 may be fixed to the outer circumferential surface of the upper jacket 15 by, for example, bolts (not shown). The first tooth member 60 may alternatively be formed of a single material integrally with the upper jacket 15.

Figure 10:
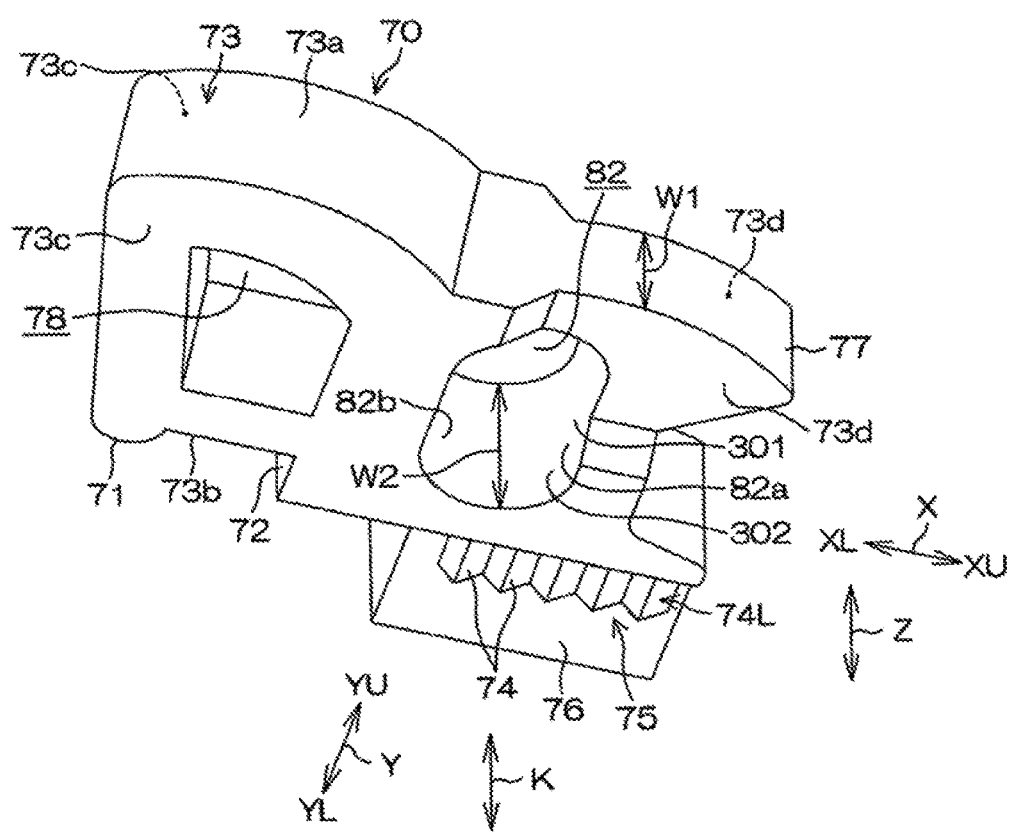
FIG. 10 is an enlarged perspective view of a second tooth member.

The following describes the second tooth member 70. FIG. 10 is an enlarged perspective view of the second tooth member 70. As shown in FIG. 10, the second tooth member 70 includes a body portion 73 and a tooth-forming portion 75. The body portion 73 includes a received portion 71 and a driving portion 72. The tooth-forming portion 75 has formed thereon second teeth 74 in positions extending from the body portion 73 and separate from the received portion 71. As shown in FIG. 13A, the body portion 73 has a substantially quadrangular plate-like shape in a side view (i.e., as viewed from the right-left direction Z). The body portion 73 includes an upper surface 73a serving as a surface on the tilt directional upper side YU of the body portion 73, a lower surface 73b serving as a surface on the tilt directional lower side YL of the body portion 73, and a pair of side surfaces 73c (FIG. 4 shows only one of the side surfaces 73c) facing each other in the right-left direction Z. The body portion 73 has formed therein a lightening hole 78 constituted by a through-hole passing through the pair of side surfaces 73c.

Figure 14:
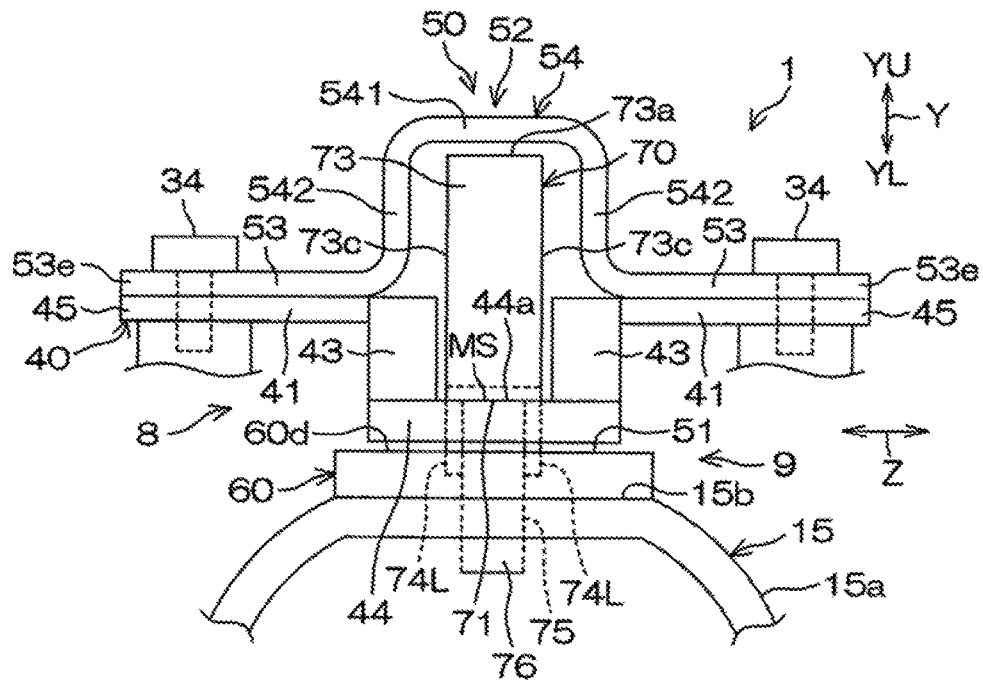
FIG. 14 is a schematic view of a structure in the vicinity of the impact absorbing mechanism as viewed from below in the column axial direction in the first embodiment.

As shown in FIG. 14, a clearance is provided between the upper surface 73a on the body portion 73 and the upper plate 541 of the connecting portion 54 of the guidance/restriction member 52. During the secondary collision, the upper plate 541 abuts on the upper surface 73a on the body portion 73 to restrict lifting of the second tooth member 70 moving toward the column axial directional lower side XL. A predetermined amount of clearance is provided between each of the side surfaces 73c on the body portion 73 and corresponding one of the side plates 542 of the connecting portion 54 of the guidance/restriction member 52.

As shown in FIG. 13A, the received portion 71 is constituted by a curved projection provided at the lower end in the column axial direction X of the lower surface 73b on the body portion 73. As shown in FIGS. 13A and 14, the received portion 71 is placed on a receiving surface 44a (corresponding to an upper surface) provided on the movable portion 44 of the impact absorbing member 40 constituting a receiving member, and is received by the receiving surface 44a. As shown in FIG. 13A, the second tooth member 70 is rotatably supported by a supporting point MS that is movable in the column axial direction X and is formed in a position on the receiving surface 44a where the receiving surface 44a makes contact with the received portion 71.

The driving portion 72 is a stepped portion provided on the lower surface 73b on the body portion 73, and faces the column axial directional lower side XL. The driving portion 72 is separated from the received portion 71 toward the column axial directional upper side XU. The driving portion 72 constituted by the stepped portion faces an end surface on the column axial directional upper side XU of the movable portion 44 in the column axial direction X. During the secondary collision, the driving portion 72 abuts on the movable portion 44, and presses to move the movable portion 44 toward the column axial directional lower side XL.

The tooth-forming portion 75 is a plate member extending so as to project from the lower surface 73b on the body portion 73. The tooth-forming portion 75 is disposed on the column axial directional upper side XU of the driving portion 72. A pair of side surfaces 75a on the tooth-forming portion 75 have a pair of second tooth rows 74L in each of which the second teeth 74 are formed side by side. FIGS. 4, 13A, and 13B show only one of the second tooth rows 74L on one of the side surfaces 75a.

The pair of second tooth rows 74L direct tooth tips of the second teeth 74 thereof laterally outward in directions opposite to each other. The second teeth 74 of each of the second tooth rows 74L are meshable, from the tooth trace direction D, with the first teeth 62 of corresponding one of the first tooth rows 62L. As shown in FIG. 13A, the second tooth member 70 includes a plate-like extending portion 76 extending from the tooth-forming portion 75 so as to be inserted into the slit 15c of the upper jacket 15. During the telescopic adjustment, the extending portion 76 abuts on inner surfaces of the slit 15c, whereby the first tooth member 60 and the second tooth member 70 are aligned in position with each other in the right-left direction Z. This allows the first teeth 62 to easily fit with the second teeth 74 when the first teeth 62 mesh with the second teeth 74.

The following describes the guide mechanism 80. As shown in FIGS. 4 and 13A, the guide mechanism 80 includes a guide shaft 81 and an elongated hole 82. The guide shaft 81 is an insertion shaft extending in the right-left direction Z. The elongated hole 82 is an insertion hole that is formed in the body portion 73 of the second tooth member 70, the guide shaft 81 being inserted in the elongated hole 82. The guide mechanism 80 guides the second tooth member 70 in meshing and unmeshing directions. The guide shaft 81 serves as a connecting member connecting the second tooth member 70 to the lower jacket 16. The guide shaft 81 serving as the connecting member is fracturable during the secondary collision. During the secondary collision, the guide shaft 81 is fractured to disconnect the second tooth member 70 from the lower jacket 16.

In the tooth locked state (meshed state), the direction of extension of the elongated hole 82 in the side view (as viewed from the right-left direction Z) may be a direction along the tooth trace direction D of the first teeth 62, or may be a direction tilted toward the column axial directional upper side XU or the column axial directional lower side XL with respect to the tooth trace direction D of the first teeth 62. As shown in FIG. 10, a recess 73d is formed at a portion on the column axial directional upper side XU and the tilt directional upper side YU of each of the side surfaces 73c on the body portion 73 of the second tooth member 70. A substantially half portion on the tilt directional upper side YU of a rim portion on the column axial directional upper side XU of the elongated hole 82 is located in the recess 73d.

Figure 9A:
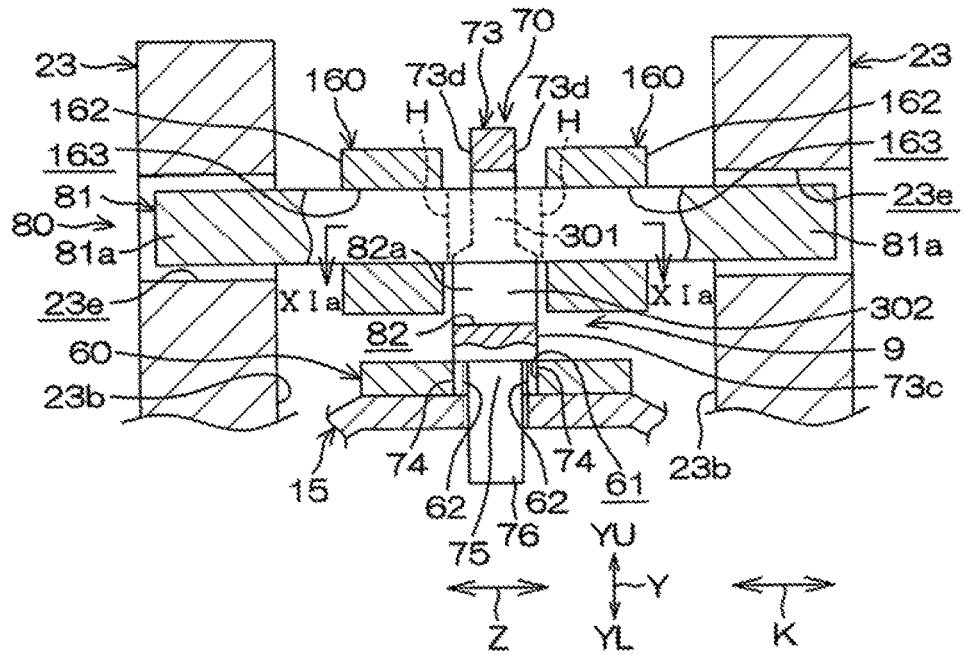
FIGS. 9A and 9B are IX-IX sectional views of FIG. 7, FIG. 9A showing a meshed state of the tooth lock mechanism, and FIG. 9B showing an unmeshed state of the tooth lock mechanism.
Figure 9B:
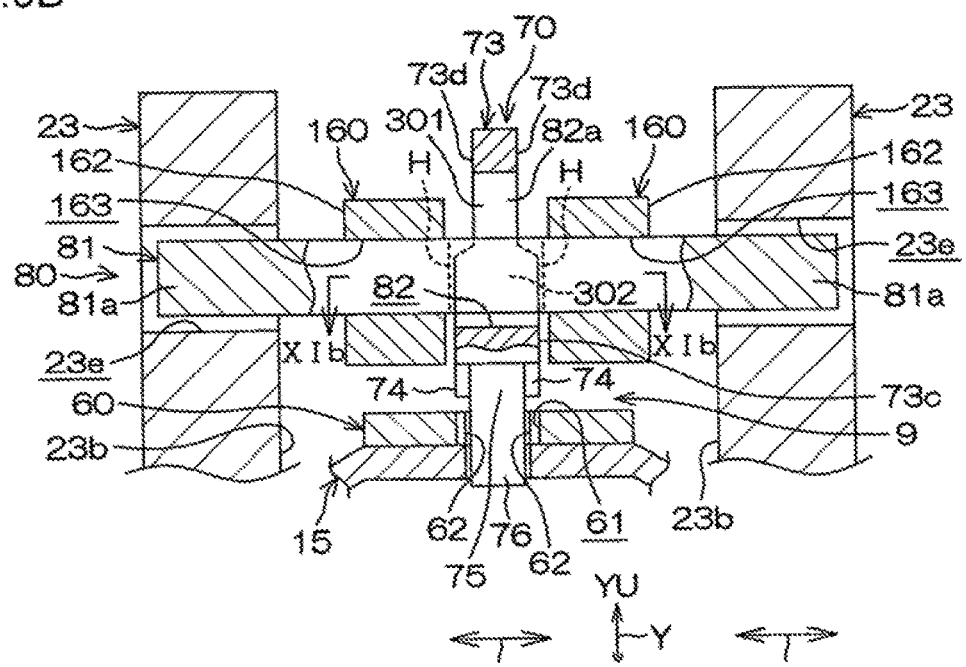
Figure 11A:
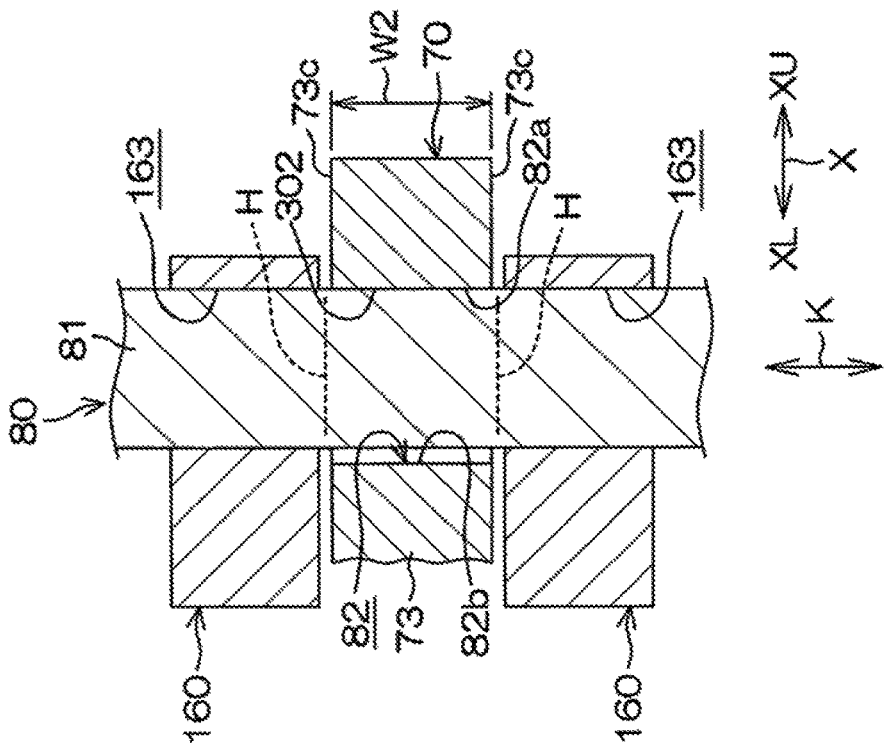
FIGS. 11A and 11B are sectional views of a structure in the vicinity of the guide shaft that fractures during the secondary collision, FIG. 11A being a XIa-XIa sectional view of FIG. 9A, and FIG. 11B being a XIb-XIb sectional view of FIG. 9B.
Figure 11B:
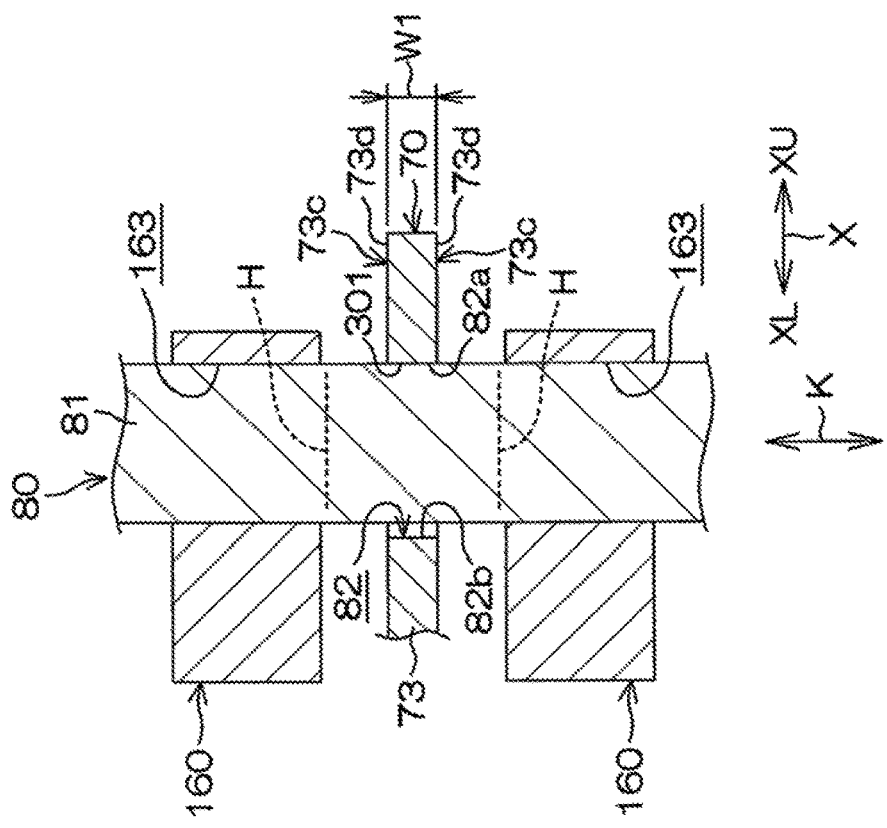

In the body portion 73, the width in the right-left direction Z of the portion where the recess 73d is formed is smaller than the width of the other portion of the body portion 73. This configuration reduces the width in the right-left direction Z (pass-through direction of the elongated hole 82) of a part of the inner surface of the elongated hole 82. FIGS. 9A and 9B are IX-IX sectional views of FIG. 7. FIG. 9A shows the meshed state of the tooth lock mechanism 9. FIG. 9B shows the unmeshed state of the tooth lock mechanism 9. FIG. 11A is a XIa-XIa sectional view of FIG. 9A. FIG. 11B is a XIb-XIb sectional view of FIG. 9B.

As shown in FIG. 10, the inner surface of the elongated hole 82 includes an inner surface 82a on the column axial directional upper side XU and an inner surface 82b on the column axial directional lower side XL. The inner surface 82a on the column axial directional upper side XU of the elongated hole 82 includes a first contact portion 301 and a second contact portion 302 as a fracture toad varying portion. As shown in FIGS. 9A and 11A, the first contact portion 301 is in contact with the guide shaft 81 in the meshed state of the tooth lock mechanism 9 shown in FIG. 13A. As shown in FIGS. 9B and 11B, the second contact portion 302 is in contact with the guide shaft 81 in the unmeshed state of the tooth lock mechanism 9 shown in FIG. 13B.

As shown in FIGS. 11A and 11B, with respect to an axial direction K of the guide shaft 81, a contact width W1 of the first contact portion 301 with the guide shaft 81 is smaller than a contact width W2 of the second contact portion 302 with the guide shaft 81 (W1<W2). This configuration makes a fracture load of the guide shaft 81 (insertion shaft) during the secondary collision in the meshed state lower than a fracture load of the guide shaft 81 during the secondary collision in the unmeshed state.

That is, with respect to the axial direction K of the guide shaft 81, the second contact portion 302 that is in contact with the guide shaft 81 over the contact width W2 substantially equal to the width between a pair of planned fracture portions H functions to apply mainly a shear force to the planned fracture portions H during the secondary collision. In contrast, the first contact portion 301 having the smaller contact width W1, applies a bending force in addition to the shear force to the planned fracture portions H, and thereby serves as a fracture facilitating portion to facilitate fracture of the guide shaft 81 during the secondary collision.

Figure 8:
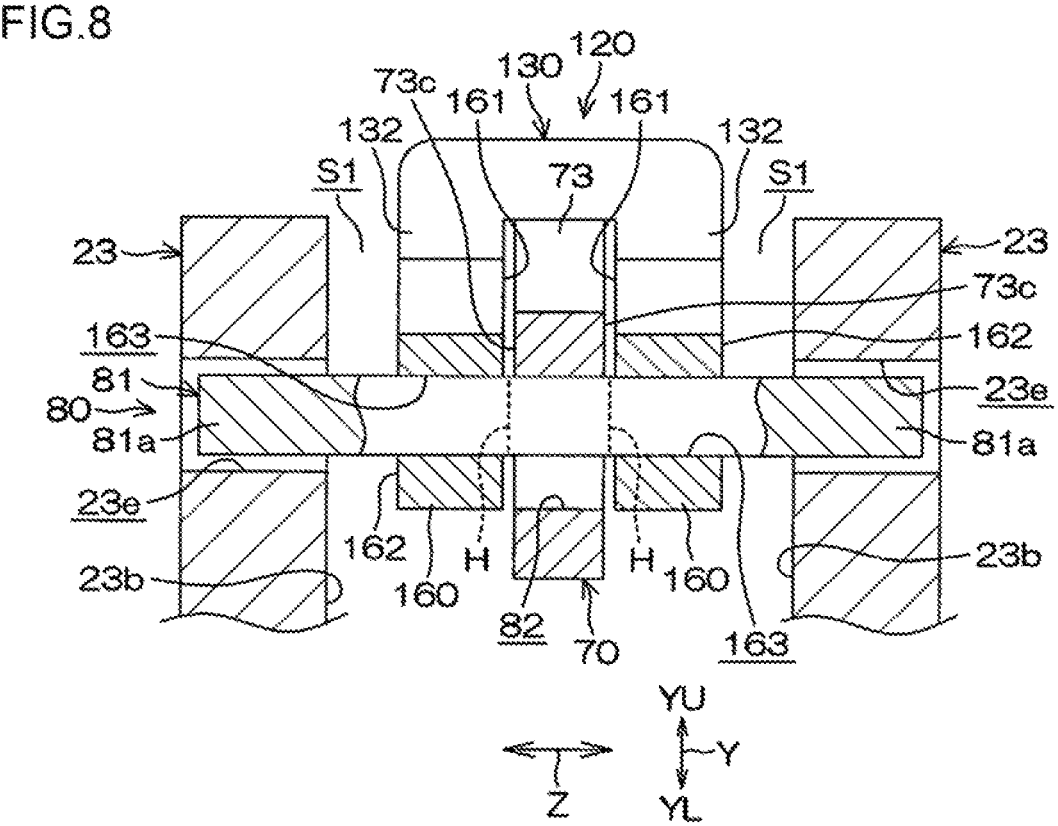
FIG. 8 is a VIII-VIII sectional view of FIG. 7, showing a structure in the vicinity of a guide shaft that fractures during a secondary collision.

In other words, the first and second contact portions 301 and 302 serve as the fracture load varying portion that varies the fracture load of the guide shaft 81 so that the fracture load of the guide shaft 81 during the secondary collision in the meshed state differs from the fracture load of the guide shaft 81 during the secondary collision in the unmeshed state. FIG. 8 is a VIII-VIII sectional view of FIG. 7. As shown in FIGS. 4 and 7, the guide shaft 81 is supported by a support member 100 supported by the lower jacket 16. The support member 100 includes a first support member 110 and a second support member 120. The first support member 110 is constituted by the guidance/restriction member 52 of the impact absorbing mechanism 8. The second support member 120 is supported by the first support member 110 (corresponding to the guidance/restriction member 52). As shown in FIGS. 7 and 8, the second support member 120 is disposed between the pair of fastened portions 23.

Figure 12A:
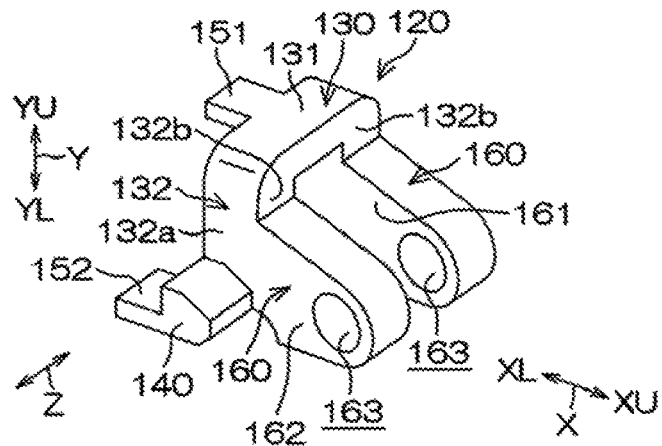
FIG. 12A is a perspective view of a second support member in the first embodiment.
Figure 12B:
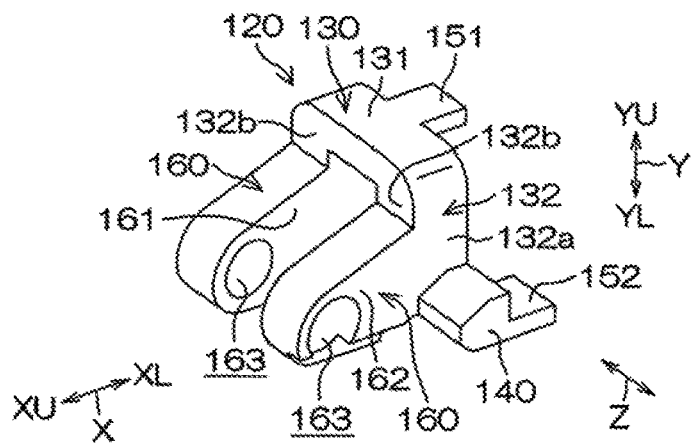
FIG. 12B is a perspective view of the second support member as viewed from an angle different from that of FIG. 12A.
Figure 12C:
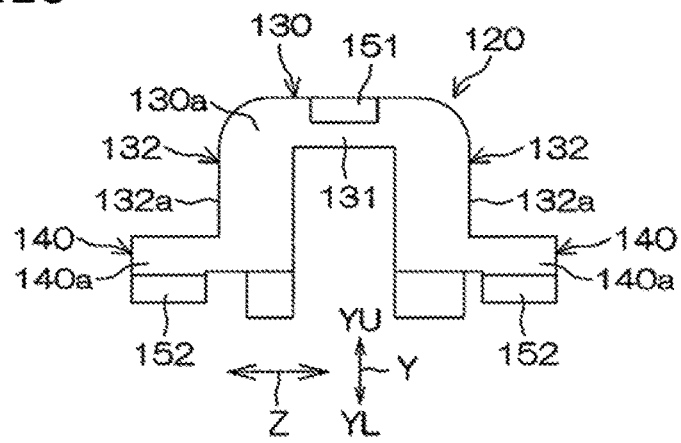
FIG. 12C is a back view (view as viewed from below in a column axial direction) of the second support member.

As shown in FIG. 5, the guidance/restriction member 52 serving as the first support member 110 includes the fixed portion 53e and an extending portion EZ (refer to FIG. 7). The fixed portion 53e is fixed to the lower jacket 16 in a position on the column axial directional lower side XL of the pair of fastened portions 23. The extending portion EZ extends from the fixed portion 53e to a position disposed between the pair of fastened portions 23 (i.e., to an upper end 52a of the guidance/restriction member 52). As shown in FIGS. 12A, 12B, and 12C, the second support member 120 includes a body portion 130, a pair of insertion projections 140, a first engagement portion 151, a pair of second engagement portions 152, and a pair of support portions 160. The second support member 120 is integrally formed of a single material (such as a synthetic resin).

As shown in FIG. 5, the first and second engagement portions 151 and 152 are engaged with the upper end 52a in the column axial direction X of the guidance/restriction member 52 serving as the first support member 110. As shown in FIGS. 12A to 12C, the body portion 130 includes an upper frame 131 extending in the right-left direction Z and a pair of side frames 132. The pair of side frames 132 extend from both ends of the upper frame 131 toward the tilt directional lower side YL. The body portion 130 has an inverted U-shape as a whole. Each of the insertion projections 140 extends so as to project from an outer side surface 132a on corresponding one of the side frames 132.

The first engagement portion 151 extends from the upper frame 131 so as to project toward the column axial directional lower side XL. Each of the second engagement portions 152 extends from a lower portion (portion on the tilt directional lower side YL) of corresponding one of the insertion projections 140 so as to project toward the column axial directional lower side XL. As shown in FIGS. 5 and 12C, an end surface 130a on the column axial directional lower side XL of the body portion 130 and end surfaces 140a on the column axial directional lower side XL of the pair of insertion projections 140 abut on an end surface 52*b* on the column axial directional upper side XU of the guidance/restriction member 52. This configuration restricts the second support member 120 from moving in the column axial direction X.

As shown in FIG. 5, the first engagement portion 151 is engaged with an upper surface 54*a* (upper surface of the upper plate 541) in the tilt direction Y of the connecting portion 54 at the upper end 52*a* in the column axial direction X of the guidance/restriction member 52. The pair of second engagement portions 152 engage with the inner surfaces 53*c* serving as lower surfaces in the tilt direction Y of the upper ends 53*a* in the column axial direction X of the pair of guidance/restriction plates 53 of the guidance/restriction member 52. The guidance/restriction member 52 is interposed and supported between the first and second engagement portions 151 and 152 in the tilt direction Y. This configuration restricts the second support member 120 from moving in the tilt direction Y.

The first and second engagement portions 151 and 152 of the second support member 120 are frictionally engaged with the guidance/restriction member 52. The second support member 120 is positioned in the right-left direction Z to the guidance/restriction member 52 with a frictional engagement force. As shown in FIG. 4, support grooves 23*c* opening toward the column axial directional lower side XL are formed at lower ends in the column axial direction X of the pair of fastened portions 23 of the lower jacket 16. The support grooves 23*c* open to the outer side surfaces 23*a* and the inner side surfaces 23*b* on the fastened portions 21 The support grooves 23*c* are disposed at a level higher in the tilt direction Y than the upper surfaces 16*d* on the walls 16*c*.

As shown in FIG. 5, each of the insertion projections 140 is inserted and supported in corresponding one of the support grooves 23*c* of the fastened portions 23. Each of the insertion projections 140 is accommodated in the support groove 23*c* together with corresponding one of the second engagement portions 152 and the upper end 53*a* of corresponding one of the guidance/restriction plates 53. An inner surface 23*d* on each of the support grooves 23*c* supports corresponding one of the insertion projections 140 so as to be slidable in the fastening direction of the pair of fastened portions 23 and a direction opposite thereto (in a direction orthogonal to the plane of FIG. 5, i.e., in the right-left direction Z.

As shown in FIGS. 12A and 12B, each of the support portions 160 extends from an end surface 132*b* on the column axial directional upper side XU of corresponding one of the side frames 132 of the body portion 130. The pair of support portions 160 are constituted by plate-like arms that are separated from and facing each other in the right-left direction Z. As shown in FIG. 8, the body portion 73 of the second tooth member 70 is disposed between the pair of support portions 160 and between the pair of side frames 132 of the second support member 120.

As shown in FIG. 12A, the pair of support portions 160 have formed therein support holes 163 into which the guide shaft 81 is press-fitted. As shown in FIG. 8, each of a pair of ends 81*a* in the axial direction of the guide shaft 81 is loosely fitted in a loose fitting hole 23*e* provided in corresponding one of the fastened portions 23. That is, the guide shaft 81 is positioned by second support member 120 supported by the guidance/restriction member 52 (first support member 110; refer to FIG. 7). The loose fitting hole 23*e* shown in FIG. 8 restricts the amount of movement of the guide shaft 81 if the guide shaft 81 is displaced during the telescopic adjustment.

The pair of support portions 160 include a pair of slide guide surfaces 161 and outer side surfaces 162. The pair of slide guide surfaces 161 are constituted by mutually facing inner side surfaces. Each of the outer side surfaces 162 faces corresponding one of the inner side surfaces 23*b* on the fastened portions 23 across a clearance S1. The amount of the clearance S1 is set to an amount at which the inner side surfaces 23*b* on the fastened portions 23 do not interfere with facing surfaces (the outer side surfaces 132*a* on the side frames 132 and the outer side surfaces 162 on the support portions 160) of the second support member 120 that face the inner side surfaces 23*b* even if the distance between the pair of fastened portions 23 fastened at the time of locking is reduced. Consequently, the second support member 120 and the guide shaft 81 supported thereby do not receive a load from the fastened portions 23 when the fastening mechanism 7 is locked.

Each of the slide guide surfaces 161 faces corresponding one of the side surfaces 73*c* on the body portion 73 of the second tooth member 70. The pair of slide guide surfaces 161 slidingly guide the facing side surfaces 73*c* on the body portion 73 of the second tooth member 70 in the meshing and unmeshing directions while restricting the second tooth member 70 from moving in the axial direction of the guide shaft 81 (in the right-left direction Z). The guide shaft 81 is made of a resin, and is fractured, during the secondary collision, by, for example, an impact load received from the second tooth member 70 in the meshed state between the first teeth 62 and the second teeth 74. Specifically, the guide shaft 81 is fractured at the two planned fracture portions H each disposed between corresponding one of the pair of slide guide surfaces 161 and corresponding one of the side surfaces 73*c* on the body portion 73 of the second tooth member 70.

The following describes the interlocking mechanism 90. As shown in FIG. 4, the interlocking mechanism 90 includes an urging member 170 and a driving member 180. As shown in FIG. 13A, the urging member 170 is a spring member that rotationally urges the second tooth member 70 that is supported by the supporting point MS and guided by the guide mechanism 80 such that the first teeth 62 of the first tooth member 60 mesh with the second teeth 74. The urging member 170 pressingly urges the received portion 71 of the second tooth member 70 to the receiving surface 44*a* on the movable portion 44 of the impact absorbing member 40. The driving member 180 drives the second tooth member 70 against the urging member 170 such that the meshing of the first teeth 62 of the first tooth member 60 with the second teeth 74 is released.

As shown in FIG. 4, the driving member 180 includes a tubular body portion 182 and a release projection 184. The body portion 182 has a fitting hole 181 in which the fastening shaft 25 is inserted and fitted in an integrally rotatable manner. The release projection 184 projects from an outer circumference 183 of the body portion 182. As shown in FIG. 13A, the outer circumference of the fastening shaft 25 has formed thereon a pair of flat portions 25*c* defining a width across flats therebetween on the outer circumference of the fastening shaft 25. The inner circumferential surface of the fitting hole 181 has a pair of flat portions that engage with the pair of flat portions 25*c*. The fastening shaft 25 may be spline-fitted with the fitting hole 181.

As shown in FIGS. 4 and 7, the urging member 170 includes a pair of first engagement portions 171, a second engagement portion 172, and a pair of coil portions 173. The pair of first engagement portions 171 engages with the lower jacket 16. The second engagement portion 172 engages with the second tooth member 70. The pair of coil portions 173 surround the outer circumference 183 of the body portion 182 at a pair of ends in the axial direction of the body portion 182 of the driving member 180. Each of the coil portions 173 includes one end 173a on the column axial directional upper side Xli thereof and another end 173b on the column axial directional lower side XL thereof.

Each of the first engagement portions 171 extends orthogonally (laterally outward, i.e., in the right-left direction Z) from one of the ends 173a of corresponding one of the coil portions 173, and is engaged with an engagement recess 23f serving as an engagement portion of corresponding one of the fastened portions 23. As shown in FIG. 7, the second engagement portion 172 extends orthogonally from each of the other ends 173b so as to connect the other ends 173b of the pair of coil portions 173 to each other. As shown in FIG. 13A, the second engagement portion 172 engages with the upper surface 73a on the body portion 73 of the second tooth member 70.

The release projection 184 engages with an engagement projection 77 serving as an engagement portion provided at the body portion 73 of the second tooth member 70 as the fastening shaft 25 rotates toward the unlocking direction. This causes the release projection 184 to rotationally displace the second tooth member 70 against the urging member 170 such that the meshing of the first teeth 62 of the first tooth. member 60 with the second teeth 74 is released, Rotationally operating the operating lever 26 toward the locking direction (counterclockwise in FIG. 13B) rotates the driving member 180 counterclockwise together with the fastening shaft 25 from the state shown in FIG. 13B to the state shown in FIG. 13A.

This operation releases the release projection 184 of the driving member 180 from the engagement with the engagement projection 77 of the second tooth member 70. This causes the urging member 170 to rotationally drive the second tooth member 70 clockwise about the supporting point MS, and thus causes the second teeth 74 to mesh with the first teeth 62 from the tooth trace direction D (refer to FIG. 13A). Due to this, the telescopic lock by the tooth lock is achieved.

Conversely, rotationally operating the operating lever 26 toward the unlocking direction (clockwise in FIG. 13A) rotates the driving member 180 clockwise together with the fastening shaft 25 from the state shown in FIG. 13A to the state shown in FIG. 13B. This operation causes the release projection 184 of the driving member 180 to push up the engagement projection 77 of the second tooth member 70. This pushing up rotationally drives the second tooth member 70 counterclockwise about the supporting point MS, and separates the second teeth 74 along the tooth trace direction D from the first teeth 62 to release the meshing (refer to FIG. 13B). Due to this, the telescopic lock by the tooth lock is released.

As shown in FIG. 4, the steering system 1 includes a first restriction mechanism 210 and a second restriction mechanism 220 that restrict a pair of end positions of the moving range of the upper jacket 15 during the telescopic adjustment. The first restriction mechanism 210 restricts the position in the column axial direction X of the upper jacket 15 when the upper jacket 15 is in the most extended position where the upper jacket 15 is most extended from the lower jacket 16. The second restriction mechanism 220 restricts the position in the column axial direction X of the upper jacket 15 when the upper jacket 15 is in the most contracted position where the upper jacket 15 is most contracted to the lower jacket 16.

The first restriction mechanism 210 includes a first stopper portion 211 and a first engagement portion 212. The first stopper portion 211 is held by the fastened portion 23 corresponding the other of the fastening members 30 of the lower jacket 16. The first engagement portion 212 is provided integrally with the first tooth member 60, and engages with the first stopper portion 211 in the state where the upper jacket 15 is in the most extended position.

The first engagement portion 212 is a rectangular cuboid-shaped block projectingly formed integrally with the topside surface 60d on the first tooth member 60.

The first stopper portion 211 is inserted and held in a holding hole 23g passing through the fastened portion 23 corresponding the other of the fastening members 30 in the right-left direction Z. A part of the first stopper portion 211 projects from one of the inner side surfaces 23b on the fastened portion 23 corresponding the other of the fastening members 30, and is slidingly in contact with the topside surface 60d on the first tooth member 60 during the telescopic adjustment. Although not shown, the first stopper portion 211 includes, at least in a part thereof, a current-carrying member, and is in contact with the inner side surface 19b on the side plate 19 so as to be capable of carrying a current thereto. The first stopper portion 211 is in contact with the upper jacket 15 through the first tooth member 60 so as to be capable of carrying the current to the upper jacket 15. This configuration connects the upper jacket 15 to the lower jacket 16 so as to be capable of carrying the current therebetween through the first stopper portion 211 and the first tooth member 60.

An electrically conducting path needs to be ensured in the steering system 1 in order to conduct a horn switch (not shown) installed in the steering member 10 to the vehicle body 2. However, grease (insulating) is often applied between the upper jacket 15 and the lower jacket 16 and between the lower jacket 16 and the side plates 19 in order to smooth the sliding between these members during the tilt adjustment and the telescopic adjustment. In that case, the electrically conducting path is difficult to be established between these members.

Hence, in the present embodiment, a conductive part (first tooth member 60) on the upper jacket 15 and a conductive member (first stopper portion 211) in contact with the side plate 19 are provided. This configuration can ensure an electrically conducting path from the steering member 10 to the vehicle body 2, sequentially through the steering shaft 3, the upper jacket 15, the conductive member (first stopper portion 211), and the upper bracket 6, while providing excellent ease of assembly. Since the first stopper portion 211 is held in the holding hole 23g, no increase in size occurs, and thus space saving can be achieved.

The second restriction mechanism 220 includes a second stopper portion 221 and a second engagement portion 222. The second stopper portion 221 is provided on an end surface on the column axial directional upper side KU of the tooth-forming portion 75 of the second tooth member 70. The second engagement portion 222 is fixed to the first tooth member 60, and engages with the second stopper portion 221 in the state where the upper jacket 15 is in the most contracted position. During the secondary collision while the tooth lock mechanism 9 is in the meshed state, when the upper jacket 15 starts to move toward the column axial directional lower side XL relative to the lower jacket 16, the second tooth member 70 meshing with the first tooth member 60 fixed to the upper jacket 15 applies an impact force to the guide shaft 81 supported by the second support member 120.

Figure 15:
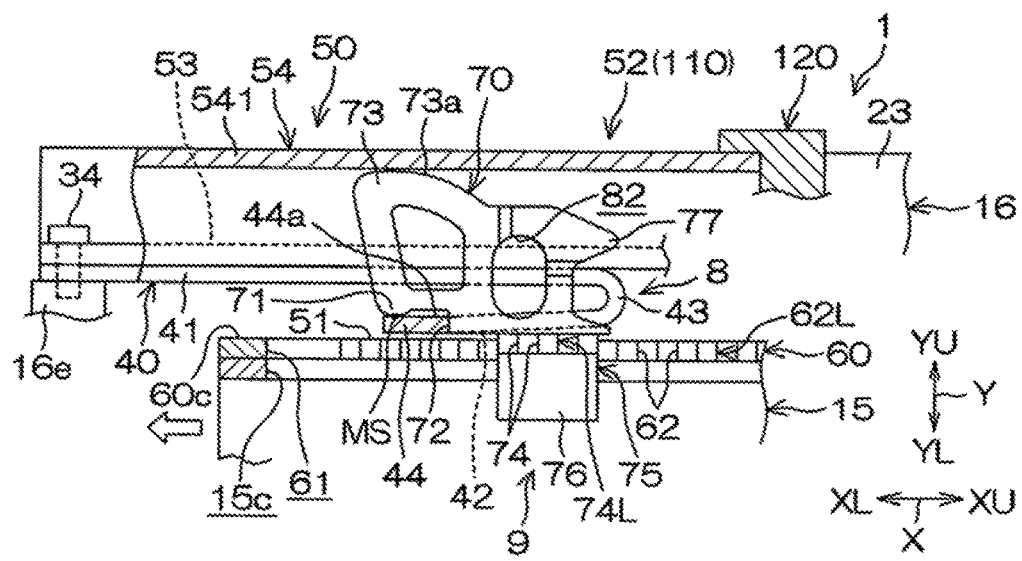
FIG. 15 is a partially cutaway schematic side view of the impact absorbing mechanism in the meshed state during the secondary collision in the first embodiment.

Due to this, the guide shaft 81 is fractured at the two planned fracture portions H shown in FIGS. 9A and 11A. As the guide shaft 81 is fractured, the second tooth member 70 breaks away from the support by the second support member 120, and, as shown in FIG. 15, moves together with the upper jacket 15 toward the column axial directional lower side XL while remaining meshed with the first tooth member 60. This operation causes the movable portion 44 of the impact absorbing member 40 to be pressed by the driving portion 72 of the second tooth member 70 to move toward the column axial directional lower side XL.

The movement of the movable portion 44 causes the impact absorbing member 40 to be deformed while moving the positions of the fold-back portions 43 toward the column axial directional lower side XL so that the first plate portions 41 decrease in length and the second plate portions 42 increase in length in the column axial direction X. The deformation absorbs energy due to the secondary collision, During the secondary collision, the guidance/restriction plates 53 of the guidance/restriction member 52 guide the folding deformation from the first plate portions 41 to the fold-back portions 43 while restricting the lifting of the first plate portions 41. During the secondary collision, the guidance/restriction surfaces 51 in the topside surface 60d on the first tooth member 60 guide the deformation from the fold-back portions 43 to the second plate portions 42 so as to keep the second plate portions 42 substantially parallel to the first plate portions 41 while restricting the second plate portions 42 from bulging between the fold-back portions 43 and the movable portion 44. In other words, the deformed movement of the impact absorbing member 40 is guided between the guidance/restriction plates 53 of the guidance/ restriction member 52 and the guidance/restriction surfaces 51 on the first tooth member 60.

The upper plate 541 of the connecting portion 54 of the guidance/restriction member 52 guides the upper surface 73a on the body portion 73 of the second tooth member 70 toward the column axial directional lower side XL. The guidance/restriction surfaces 51 on the first tooth member 60 guide the movable portion 44 receiving the received portion 71 of the second tooth member 70 toward the column axial directional lower side L. This guides the movement of the second tooth member 70 toward the column axial directional lower side XL.

In contrast, during the secondary collision while the tooth lock mechanism 9 is in the unmeshed state, the upper jacket 15 moves toward the column axial directional lower side XL relative to the lower jacket 16. When the upper jacket 15 has moved to the most contracted position, the second engagement portion 222 provided at the first tooth member 60 moving integrally with the upper jacket 15 collides against the second stopper portion 221 of the second tooth member 70 held in the unmeshed state, and applies an impact force to the guide shaft 81 supported by the second support member 120.

Figure 16:
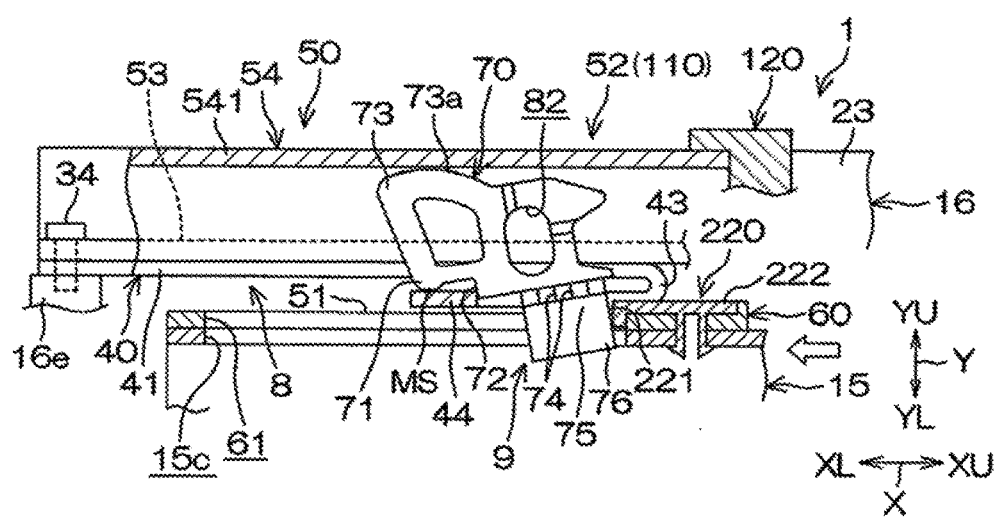
FIG. 16 is a partially cutaway schematic side view of the impact absorbing mechanism in the unmeshed state during the secondary collision in the first embodiment.

Due to this, the guide shaft 81 is fractured at the two planned fracture portions H shown in FIGS. 9B and 11B. As the guide shaft 81 is fractured, the second tooth member 70 breaks away from the support by the second support member 120, and, as shown in FIG. 16, moves toward the column axial directional lower side XL together with the upper jacket 15. This operation causes the movable portion 44 of the impact absorbing member 40 to be pressed by the driving portion 72 of the second tooth member 70 to move toward the column axial directional lower side XL. As a result, the impact absorbing member 40 is deformed and absorbs the energy due to the secondary collision.

In the present embodiment, during the secondary collision in the fastened state, the second tooth member 70 in the meshed state fractures the connecting member (guide shaft 81 as the insertion shaft), and, as shown in FIG. 15, deforms the impact absorbing member 40 to absorb the impact. During the secondary collision in the unfastened state, the driving member (second engagement portion 222 of the second restriction mechanism 220) moving integrally with the upper jacket 15 abuts on the second tooth member 70 in the unmeshed state to fracture the connecting member (guide shaft 81), and, as shown in FIG. 16, deforms the impact absorbing member 40 via the second tooth member 70 to absorb the impact. The same impact absorbing member 40 is used to absorb the impact in the fastened state and the unfastened state. That is, the simple structure can absorb the impact due to the secondary collision even in the unfastened state, regardless of the fastening state.

The driving member (second engagement portion 222) abuts on the second stopper portion 221 to perform the function to restrict one of the end positions of the telescopic adjustment range in the unfastened state. This configuration can make the structure simpler than in the case where a member for abutting on the second stopper portion 221 is provided separately from the driving member. In other words, in the second restriction mechanism 220 for restricting the position in the column axial direction X of the upper jacket 15 when the upper jacket 15 is in the most contracted position where the upper jacket 15 is most contracted to the lower jacket 16, the second engagement portion 222 is used also as the driving member. Due to this, the structure is simplified.

The fracture load of the guide shaft 81 (insertion shaft, or connecting member) during the secondary collision can be varied between the meshed state (corresponding to the fastened state of the fastening mechanism) and the unmeshed state (corresponding to the unfastened state of the fastening mechanism) by an effect of the fracture load varying portion (first and second contact portions 301 and 302) provided on the inner surface on the column axial directional upper side XU of the insertion hole (elongated hole 82) in the second tooth member 70. The fracture load varying portion includes the first and second contact portions 301 and 302. That is, of the first contact portion 301 corning in contact with the guide shaft 81 in the meshed state and the second contact portion 302 coming in contact with the guide shaft 81 in the unmeshed state, a contact portion having a smaller contact width in the axial direction K of the guide shaft 81 more facilitates the bending of the guide shaft 81 during the secondary collision, and consequently makes the fracture load of the guide shaft 81 smaller. Thus, the fracture load of the guide shaft 81 during the secondary collision can be varied between the fastened state and the unfastened state.

Specifically, the fracture load of the guide shaft 81 (insertion shaft) during the secondary collision in the meshed state (corresponding to the fastened state of the fastening mechanism 7) is made smaller than the fracture load of the guide shaft 81 during the secondary collision in the unmeshed state (corresponding to the unfastened state of the fastening mechanism 7) by the effect of the fracture facilitating portion (first contact portion 301) provided on the inner surface 82a on the column axial directional upper side XL of the elongated hole 82 in the second tooth member 70. During the secondary collision in the meshed state, a load obtained by adding the sliding frictional force of the upper jacket 15 relative to the lower jacket 16 to the fracture load of the guide shaft 81 serves as a break-away load. Due to this, the difference between the break-away load in the meshed state (fastened state) and the break-away load in the unmeshed state (unfastened state) can be reduced.

On the inner surface 82*a* on the column axial directional upper side XU of the elongated hole 82 in the second tooth member 70, the contact width WI of the first contact portion 301 (fracture facilitating portion) in contact with the guide shaft 81 in the meshed state is smaller than the contact width W2 of the second contact portion 302 in contact with the guide shaft 81 in the unmeshed state (W1<W2). This configuration. facilitates the bending of the guide shaft 81 during the secondary collision in the meshed state, and thus makes the fracture load of the guide shaft 81 during the secondary collision in the meshed state smaller than the fracture load of the guide shaft 81 during the secondary collision in the unmeshed state.

Although not shown, as a modification of the present embodiment, an example can be given in which the contact width W2 of the second contact portion 302 is smaller than the contact width W1 of the first contact portion 301, and thus the fracture load of the guide shaft 81 during the secondary collision in the unmeshed state (corresponding to the unfastened state of the fastening mechanism 7) is smaller than fracture load of the guide shaft 81 (insertion shaft) during the secondary collision in the meshed state (corresponding to the fastened state of the fastening mechanism 7). A contact portion having a smaller contact width (either one of the first contact portion 301 and the second contact portion) may be formed by a top portion of a projection provided on the inner surface of the elongated hole 82 (insertion hole).

As shown in FIG. 13A, the second tooth member 70 is configured to be rotatably supported by the supporting point MS that is movable in the column axial direction X and is formed in the position where the receiving surface 44*a* on the receiving member (impact absorbing member 40) makes contact with the received portion 71 of the second tooth member 70. With this configuration, in the assembly process, an operation to place the received portion 71 of the second tooth member 70 on the receiving surface 44*a* on the receiving member (impact absorbing member 40) can form the movable supporting point MS. Consequently, a conventional troublesome operation, such as inserting a support shaft for serving as a rotational center of the tooth member into a support hole, is not needed, so that the ease of assembly is improved.

Since the impact absorbing member 40 is used also as the receiving member, the structure can be simplified. As shown in FIG. 8, the guide shaft 81 to be fractured during the secondary collision is supported by the pair of support portions 160 of the second support member 120 in the state of being separated from the pair of fastened portions 23 that are fastened by the fastening mechanism 7 and displaced in the right-left direction Z. The pair of support portions 160 are provided, as shown in FIG. 7, at the second support member 120 supported by the extending portion EZ extending, as shown in FIG. 5, from the fixed portion 53*e* fixed to the lower jacket 16 in the position on the column axial directional lower side XL of the pair of fastened portions 23 to the position between the pair of fastened portions 23.

Figure 17A:
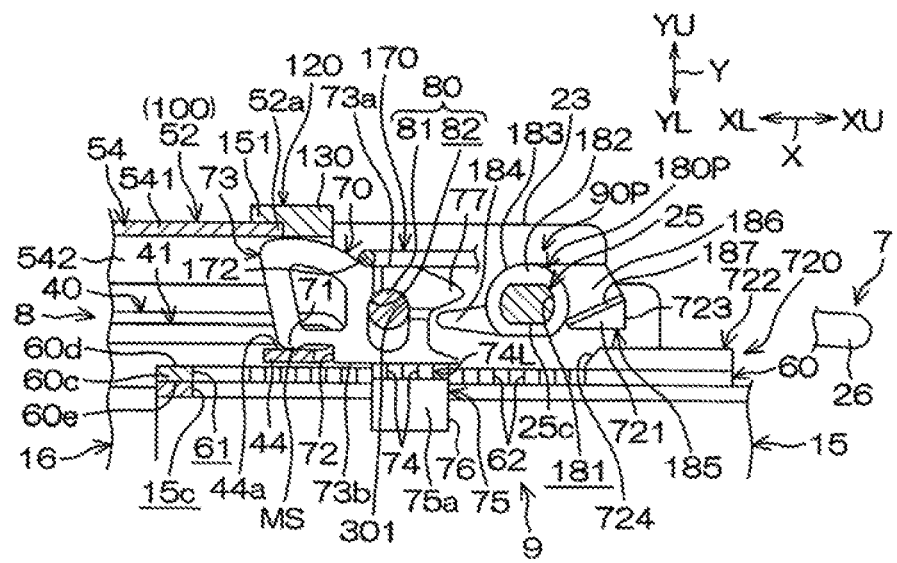
FIGS. 17A and 17B are sectional views of a structure in the vicinity of a tooth lock mechanism in a steering system according to a second embodiment of the present invention, FIG. 17A showing the meshed state (locked state), and FIG. 17B showing the unmeshed state (unlocked state)
Figure 17B:
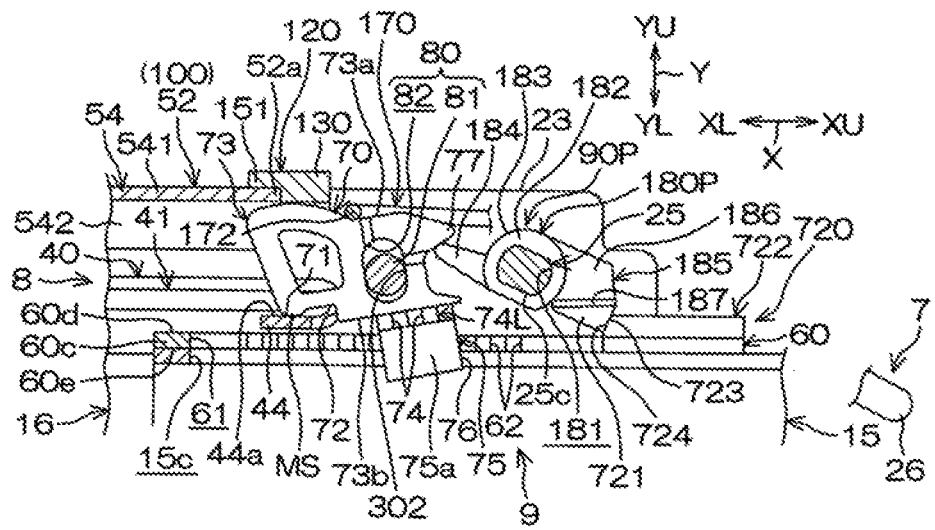

Consequently, during the secondary collision, the guide shaft 81 is fractured at a stable fracture load by application of a load from the pair of support portions 160 that is not affected by variation in displacement of the pair of fastened portions 23. This enables obtaining of stable impact absorbing characteristics during the secondary collision. The pair of support portions 160 include the pair of slide guide surfaces 161 that slidingly guide the pair of side surfaces 73*c* on the body portion 73 of the second tooth member 70. During the secondary collision, the slide guide surfaces 161 on the pair of support portions 160 restrict the second tooth member 70 from moving in the axial direction of the guide shaft 81, and consequently, the guide shaft 81 is fractured by a more stable fracture load during the secondary collision. This enables obtaining of the stable impact absorbing characteristics during the secondary collision. FIGS. 17A and 17B are sectional views of a structure in the vicinity of a tooth lock mechanism in a steering system according to a second embodiment of the present invention, FIG. 17A showing the locked. state (meshed state), and FIG. 17B showing the unlocked state (unmeshed state).

As shown in FIGS. 17A and 17B, the second embodiment differs from the first embodiment mainly in the following respect. That is, a second restriction mechanism 720 for restricting one of the end positions (most contracted position) of the telescopic adjustment range of the upper jacket 15 is constituted by a second stopper portion 721 and a second engagement portion 722. The second stopper portion 721 is provided at an driving member 180P for unmeshing in an interlocking mechanism 90P. The second engagement portion 722 is a driving member that drives the impact absorbing member 40 during the secondary collision.

The second stopper portion 721 has a stopper surface 723. The second engagement portion 722 is fixed integrally to the first tooth member 60. The second engagement portion 722 has, at an end on the column axial directional lower side XL thereof, an engagement surface 724 that engages with the stopper surface 723 on the second stopper portion 721. The engagement surface 724 on the second engagement portion 722 is formed as an inclined surface inclined with respect to the column axial direction X. As shown in FIG. 17B, in the unmeshed state, the stopper surface 723 on the second stopper portion 721 is inclined at the same inclination angle as that of the engagement surface 724 but in the opposite direction to that of the engagement surface 724 with respect to the column axial direction X.

As shown in FIG. 17B, the second engagement portion 722 serving as the driving member abuts on the second stopper portion 721 in the unmeshed state to restrict the end position (most contracted position) of the telescopic adjustment range of the upper jacket 15. At this time, the normal lines of the stopper surface 723 and the engagement surface 724 are directed toward the center of the fastening shaft 25 (i.e., the rotational center of the driving member 180P).

Because of this, when the end position (most contracted position) of the telescopic adjustment range is restricted, the driving member 180P is prevented from changing in attitude as a result of application of a rotational force from the second engagement portion 722 (driving member) to the driving member 180P for unmeshing. Since the driving member 180P does not change in attitude when the end position (most contracted position) is restricted, the second tooth member 70 does not change in attitude, and consequently, no load is applied to the guide shaft 81 by an impact at the time of the restriction. The operating lever 26 is not changed in attitude by the impact at the time of the restriction.

The driving member 180P is fitted in an integrally rotatable manner with the fastening shaft 25. The second stopper portion 721 is constituted by a part of a projection 185 disposed on a side of the fastening shaft 25 opposite to the release projection 184 of the driving member 180P. Specifically, the projection 185 includes a base portion 186, a fracture portion 187, and the above-described second stopper portion 721. The base portion 186 is integrally connected to the outer circumference 183 of the body portion 182. The fracture portion 187 is disposed between the base portion 186 and the second stopper portion 721. That is, the second stopper portion 721 is connected to the base portion 186 via the fracture portion 187.

Figure 18:
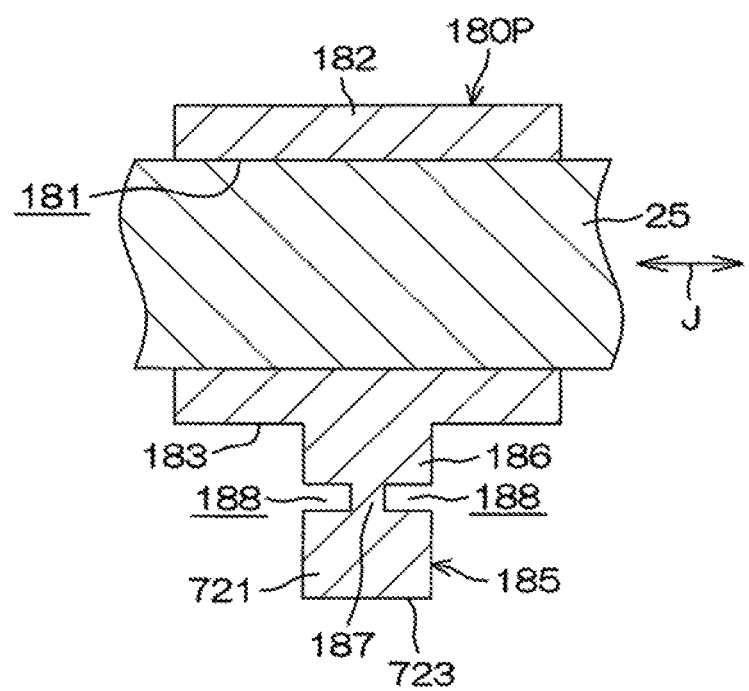
FIG. 18 is a schematic sectional view of structure in the vicinity of a projection of a driving member in the second embodiment.

The fracture portion 187 is fractured by the abutting between the second engagement portion 722 serving as the driving member and the second stopper portion 721 during the secondary collision in the unfastened state (unmeshed state). For example, as shown in FIG. 18 that is a schematic sectional view of the vicinity of the projection 185, the fracture portion 187 is formed by a bottom portion of grooves 188 extending in the column axial direction X in the state where the driving member 180P has unmeshed the second tooth member 70. The bottom portion of the grooves 188 (fracture portion 187) connects together the second stopper portion 721 and the base portion 186 in the driving member 180P.

As shown in FIG. 17A, in the meshed state, the second stopper portion 721 retreats from a moving path of the second engagement portion 722 serving as the driving member during the secondary collision. In the present embodiment, as shown in FIG. 17A, in the meshed state (fastened state), the second stopper portion 721 that restricts the end position of the telescopic adjustment range in the unmeshed state retreats from the moving path of the second engagement portion 722 (driving member) during the secondary collision. Due to this, the second engagement portion 222 (driving member) does not abut on the second stopper portion 721 during the secondary collision in the fastened state. Consequently, the same impact absorbing characteristics can be obtained during the secondary collision in the hastened state, regardless of the telescopic adjustment position.

As shown in FIG. 17B, during the secondary collision ire the unfastened state, the second engagement portion 722 abuts on the second stopper portion 721, and the fracture portion 187 is fractured to generate the impact absorbing load. Because of this, the break-away load during the secondary collision in the unfastened state can be set as desired by setting the fracture load of the fracture portion 187. The break-away of the second stopper portion 721 due to the fracture of the fracture portion 187 allows the second engagement portion 722 (driving member) to move toward the second tooth member 70, and consequently, the impact absorbing member 40 can contribute to the impact absorption during the secondary collision.

Figure 19A:
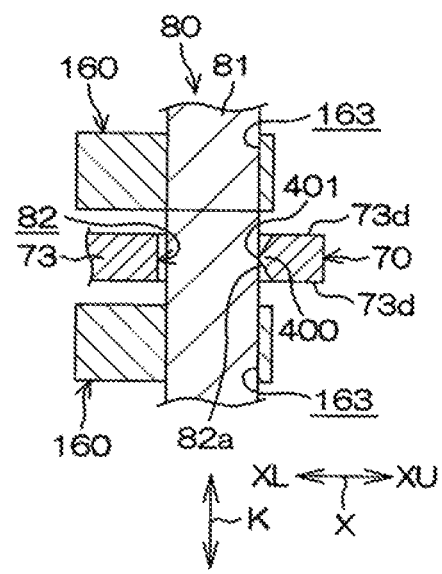
FIGS. 19A, 19B, and 19C are sectional views of structures in the vicinity of the guide shaft that fractures during the secondary collision in third, fourth, and fifth embodiments, respectively, of the present invention.
Figure 19B:
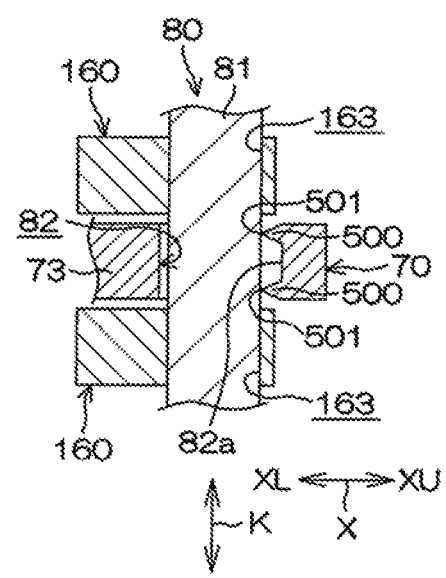
Figure 19C:
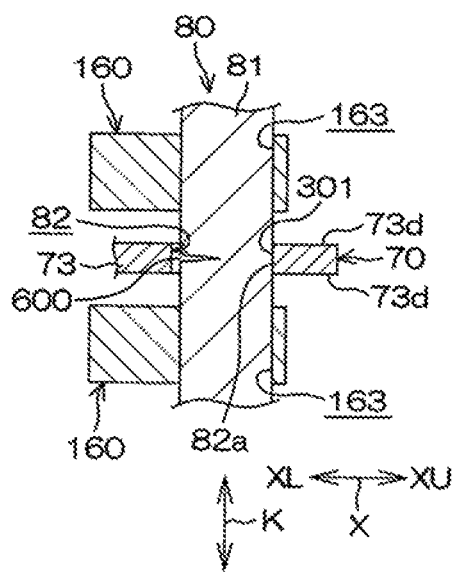

A fragile portion thinner than adjacent portions only needs to be provided as the fracture portion 187. Although not shown, the second engagement portion 722 may be formed integrally with the first tooth member 60 or the upper jacket 15, for example, by a process of cutting and raising. FIGS. 19A, 19B, and 19C are sectional views of structures in the vicinity of the guide shaft 81 that fractures during the secondary collision in third, fourth, and fifth embodiments, respectively, of the present invention.

In the third embodiment shown in FIG. 19A, the inner surface 82a on the column axial directional upper side XU of the elongated bole 82 (insertion hole) is provided with a projection 400 serving as a fracture facilitating portion (fracture load varying portion) having a top portion 401 that abuts on the guide shaft 81. The top portion 401 of the projection 400 is disposed in a central portion of the inner surface 82a with respect to the axial direction K of the guide shaft 81. The top portion 401 of the projection 400 only needs to serve as a contact portion having a smaller contact width among the first and second contact portions 301 and 302 in the first embodiment or the second embodiment. In the third embodiment, during the secondary collision in the meshed state, the top portion 401 of the projection 400 serving as the fracture facilitating portion abuts on the guide shaft 81 to facilitate stress concentration thereof, and thus facilitates cutting (fracture) by shearing the guide shaft 81.

In the fourth embodiment shown in FIG. 19B, the inner surface 82a on the column axial directional upper side XU of the elongated hole 82 (insertion hole) is provided with a pair of projections 500 serving as fracture facilitating portions (fracture load varying portions) separated in the axial direction K of the guide shaft 81. Top portions 501 of the pair of projections 500 only need to serve as a contact portion having a smaller contact width among the first and second contact portions 301 and 302 in the first embodiment or the second embodiment. In the fourth embodiment, during the secondary collision in the meshed state, the top portions 501 of the pair of projections 500 serving as the fracture facilitating portions abut on the guide shaft 81 to facilitate the stress concentration thereof, and thus facilitates the cutting (fracture) by shearing the guide shaft 81.

In the fifth embodiment shown in FIG. 19C, a notch 600 serving as a fracture facilitating portion (fracture load varying portion) is formed on the guide shaft 81. The notch 600 has, for example, a V-shaped section, and is formed on a part or the whole in the circumferential direction of the outer circumference of the guide shaft 81. The notch 600 is disposed in a central position between the pair of support portions 160 with respect to the axial direction K of the guide shaft 81. The notch 600 only needs to be disposed on the opposite side of a position facing a contact portion having a smaller contact width among the first and second contact portions 301 and 302 (the first contact portion 301 in the example shown in FIG. 19C) on the outer circumference of the guide shaft 81 of the first embodiment or the second embodiment, in the fifth embodiment, during the secondary collision in the meshed state, the notch 600 serving as the fracture facilitating portion facilitates the stress concentration of the guide shaft 81, and thus facilitates the cutting (fracture) by shearing the guide shaft 81.

The notch in FIG. 19C may be provided in the structures of FIGS. 19A and 19B.

Figure 20A:
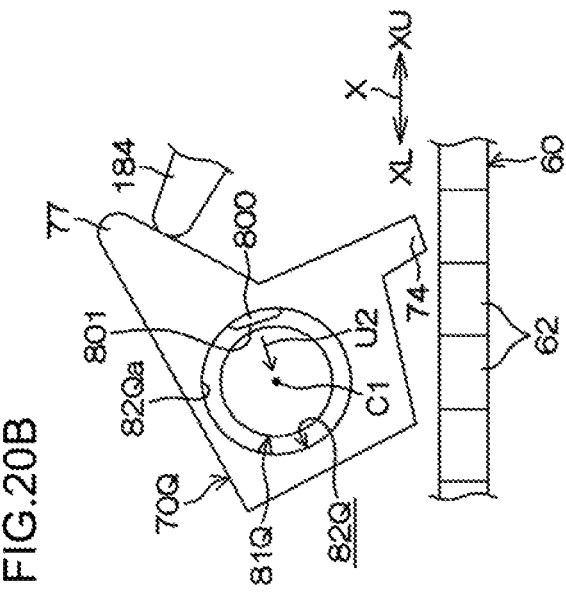
FIGS. 20A and 20B are schematic side views of a tooth lock structure in a steering system according to a sixth embodiment of the present invention, FIG. 20A showing the meshed state (locked state), and FIG. 20B showing the unmeshed state (unlocked state)
Figure 20B:
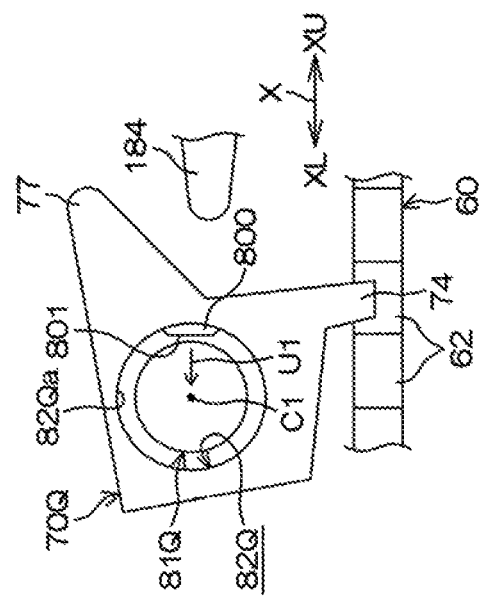

FIGS. 20A and 20B are schematic side views of a tooth lock structure in a steering system according to a sixth embodiment of the present invention. FIG. 20A showing the meshed state (locked state), and FIG. 20B showing the unmeshed state (unlocked state).

As shown in FIGS. 20A and 20B, a second tooth member 70Q includes a singular second tooth 74, the engagement projection 77, and an insertion hole 82Q formed by, for example, a circular hole. An insertion shaft 81Q supported by the lower jacket via a supporting mechanism is inserted in the insertion hole 82Q. The second tooth member 70Q is supported so as to be rotatable about the insertion shaft 81Q. The second tooth member 70Q is displaced between the meshed state and the unmeshed state along with the rotation about the insertion shaft 81Q. The insertion shaft 81Q is formed of a resin, and is fractured during the secondary collision.

An inner surface 82Qa of the insertion hole 82Q has formed thereon a projection 800 serving as a fracture load varying portion that shears the insertion shaft 81Q to cut (fracture) it during the secondary collision. During the secondary collision, a top portion 801 of the projection 800 abuts on the insertion shaft 81Q, and shears the insertion shaft 81Q to cut (fracture) it. The projection 800 is commonly used for the shearing in the meshed state shown in FIG. 20A and in the unmeshed state shown in FIG. 20B. For example, in one of the meshed state and the unmeshed state (in the meshed state of FIG. 20A, in the present embodiment), the projection 800 is disposed in a position facing a center C1 of the insertion shaft 81Q substantially in the column axial direction X, and, in the other of the meshed state and the unmeshed state (in the unmeshed state of FIG. 20B, in the present embodiment), the projection 800 is disposed in a position facing the center C1 of the insertion shaft 81Q in a direction inclined with respect to the column axial direction X.

Figure 20C:
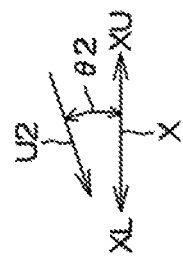
FIG. 20C is a schematic view showing a relation between a shearing direction and the column axial direction in the meshed state.
Figure 20D:
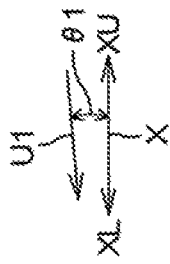
FIG. 20D is a schematic view showing the relation between the shearing direction and the column axial direction in the unmeshed state.

Consequently, during the secondary collision, an angle θ1 shown in FIG. 20C formed between a shearing direction U1 of the projection 800 to shear the insertion shaft 81Q in the meshed state and the column axial direction X differs from an angle θ2 shown in FIG. 20D formed between a shearing direction U2 of the projection 800 to shear the insertion shaft 81Q in the unmeshed state and the column axial direction X. Either of the angles θ1 and θ2 may be zero.

In the present embodiment, during the secondary collision, the shearing directions U1 and U2 of the projection 800 to shear the insertion shaft 81Q differ from each other between the meshed state (fastened state) and the unmeshed state (unfastened state), and consequently the fracture load of the insertion shaft 81Q differs therebetween. Thus, the fracture load of the insertion shaft 81Q during the secondary collision can be varied between the fastened state and the unfastened state. The present invention is not limited to the embodiments described above. For example, the second tooth member 70 may be provided with the second tooth 74 as a single tooth.

The fracture facilitating portion in the fracture load varying portion of the present invention only needs to function in either of the meshed state and the unmeshed state. That is, the fracture facilitating portion only needs to be provided so that the fracture loads in the meshed state and the unmeshed state are set according to the design. The loose fitting holes 23e of the pair of fastened portions 23 shown in FIGS. 9A and 9B may be eliminated. In that case, although not shown, each of the ends 81a of the guide shaft 81 faces corresponding one of the inner side surfaces 23b on the pair of fastened portions 23 across a predetermined clearance in the axial direction K of the guide shaft 81.

The present invention can be applied not only to a manual steering system that does not assist the steering of the steering member 10, but also to an electric power steering system that assists the steering of the steering member 10 by applying power of an electric motor to the steering shaft 3. In addition, the present invention can be variously modified within the scope described in the claims.

What is claimed is:

1. A steering system comprising:
   a steering shaft that is telescopic in a column axial direction;
   a column jacket that includes a lower jacket and an upper jacket fitted with the lower jacket, that rotatably supports the steering shaft, and that is telescopic in the column axial direction during a telescopic adjustment;
   a fastening mechanism that makes the upper jacket fastened to be held by the lower jacket;
   an impact absorbing member that is supported by the lower jacket and absorbs an impact by being deformed;
   a first tooth member that moves in the column axial direction integrally with the upper jacket;
   a second tooth member that is placed in a meshed state with the first tooth member at time of fastening by the fastening mechanism, and that is placed in an unmeshed state of releasing the meshing at time of unfastening by the fastening mechanism;
   a connecting member that connects the second tooth member to the lower jacket, and that is fracturable during a secondary collision; and
   a driving member that is movable in the column axial direction integrally with the upper jacket, and that abuts on the second tooth member in the unmeshed state to fracture the connecting member and deforms the impact absorbing member via the second tooth member during the secondary collision in the unfastened state of the fastening mechanism, wherein
   the second tooth member in the meshed state is configured to fracture the connecting member and deform the impact absorbing member during the secondary collision in the fastened state of the fastening mechanism.

2. The steering system according to claim 1, further comprising a stopper portion provided at the lower jacket or a member supported by the lower jacket, wherein the driving member abuts on the stopper portion to restrict an end position of a telescopic adjustment range of the upper jacket in the unmeshed state.

3. The steering system according to claim 2, wherein the stopper portion is configured to retreat from a moving path of the driving member during the secondary collision in the meshed state.

4. The steering system according to claim 2, wherein
   the lower jacket or the member supported by the lower jacket is connected to the stopper portion via a fracture portion that is fractured by the abutting between the driving member and the stopper portion during the secondary collision in the unmeshed state, and
   the driving member is allowed to move toward the second tooth member by break-away of the stopper portion due to the fracture of the fracture portion.

5. The steering system according to claim 3, wherein
   the lower jacket or the member supported by the lower jacket is connected to the stopper portion via a fracture portion that is fractured by the abutting between the driving member and the stopper portion during the secondary collision in the unmeshed state, and
   the driving member is allowed to move toward the second tooth member by break-away of the stopper portion due to the fracture of the fracture portion.

6. The steering system according to claim 1, wherein
   the second tooth member has an insertion hole,
   the connecting member includes an insertion shaft that extends in a direction orthogonal to the column axial direction and is inserted in the insertion hole, and that slides relative to the insertion hole as the second tooth member is rotationally displaced, and
   an inner surface on an upper side in the column axial direction of the insertion hole includes a fracture load varying portion that varies a fracture load of the insertion shaft so that the fracture load of the insertion shaft during the secondary collision in the meshed state differs from the fracture load of the insertion shaft during the secondary collision in the unmeshed state.

7. The steering system according to claim 6, wherein
   the fracture load varying portion includes a first contact portion that comes in contact with the insertion shaft during the secondary collision in the meshed state and a second contact portion that comes in contact with the insertion shaft during the secondary collision in the unmeshed state, and a contact width of the first contact portion with the insertion shaft with respect to an axial direction of the insertion shaft differs from a contact width of the second contact portion with the insertion shaft with respect to the axial direction of the insertion shaft.

8. The steering system according to claim 6, wherein the fracture load varying portion includes a projection that shears the insertion shaft during the secondary collision and that is to be commonly used for the shearing in the meshed state and the unmeshed state, and an angle formed between a shearing direction of the projection to shear the insertion shaft in the meshed state and the column axial direction differs from an angle formed between a shearing direction of the projection to shear the insertion shaft in the unmeshed state and the column axial direction.

* * * * *